United States Patent
Xu et al.

(10) Patent No.: US 12,124,620 B2
(45) Date of Patent: Oct. 22, 2024

(54) DEVICES AND METHODS FOR OPTIMIZING ELECTRONIC DEVICE USAGE BY VISUALIZING ACCESS HISTORY ON AN ALWAYS-ON DISPLAY

(71) Applicants: Qiang Xu, Richmond Hill (CA); Wei Li, Markham (CA)

(72) Inventors: Qiang Xu, Richmond Hill (CA); Wei Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/204,765

(22) Filed: Mar. 17, 2021

(65) Prior Publication Data
US 2022/0300665 A1    Sep. 22, 2022

(51) Int. Cl.
*G06F 21/84*    (2013.01)
*G06F 1/3231*   (2019.01)
(Continued)

(52) U.S. Cl.
CPC ............ *G06F 21/84* (2013.01); *G06F 1/3231* (2013.01); *G06Q 10/063114* (2013.01);
(Continued)

(58) Field of Classification Search
CPC .................. G06F 21/84; G06F 1/3231; G06F 2221/2149; G06Q 10/063114;
(Continued)

(56) References Cited

U.S. PATENT DOCUMENTS

| | | | | |
|---|---|---|---|---|
| 10,872,024 | B2 * | 12/2020 | Cranfill | G06F 11/321 |
| 2007/0268517 | A1 * | 11/2007 | Koarai | H04N 1/00973 358/1.15 |

(Continued)

FOREIGN PATENT DOCUMENTS

| | | |
|---|---|---|
| CN | 103547979 A | 1/2014 |
| CN | 108052272 A | 5/2018 |
| CN | 111445642 A | 7/2020 |

OTHER PUBLICATIONS

Boboltz, S., "Hilarious iPhone Wallpapers Remind You to Look at Your Screen Less", posted Mar. 28, 2015—updated Dec. 6, 2017, https://www.huffingtonpost.ca/entry/molly-mcleod-phone-wallpapers_n_6957248?ri18n=true.

(Continued)

*Primary Examiner* — Matthew A Eason
*Assistant Examiner* — Sujit Shah

(57) ABSTRACT

Devices and methods for optimizing electronic device usage by visualizing access history on a display of the electronic device while the device is in sleep mode are provided. The electronic device usage alert method includes collecting electronic device access history on an electronic device, obtaining electronic device access statistics from the electronic device access history, generating a visual representation of the electronic device access statistics, and displaying the visual representation on an always on display (AOD) of the electronic device. The AOD is active only when the electronic device is asleep. Reducing usage of electronic devices or certain applications have many advantages including mitigating the user addiction of electronic devices or applications.

20 Claims, 19 Drawing Sheets

(51) Int. Cl.
*G06Q 10/0631* (2023.01)
*G06Q 10/109* (2023.01)
*G09G 3/20* (2006.01)

(52) U.S. Cl.
CPC ............. *G06Q 10/109* (2013.01); *G09G 3/20* (2013.01); *G06F 2221/2149* (2013.01); *G09G 2330/021* (2013.01); *G09G 2354/00* (2013.01)

(58) Field of Classification Search
CPC .. G06Q 10/109; G09G 3/20; G09G 2330/021; G09G 2354/00
See application file for complete search history.

(56) References Cited

U.S. PATENT DOCUMENTS

| | | | | |
|---|---|---|---|---|
| 2009/0150545 | A1* | 6/2009 | Flores | G06Q 10/10 709/224 |
| 2014/0267325 | A1* | 9/2014 | Jiang | G06F 1/3218 345/520 |
| 2015/0006929 | A1* | 1/2015 | Sood | G06F 1/3265 713/323 |
| 2015/0032887 | A1* | 1/2015 | Pesek | H04W 12/08 709/224 |
| 2016/0224925 | A1* | 8/2016 | Schulz | G06Q 10/06398 |
| 2019/0347181 | A1* | 11/2019 | Cranfill | H04L 67/04 |
| 2020/0334356 | A1 | 10/2020 | Thompson | |
| 2021/0083498 | A1* | 3/2021 | Cho | G06T 11/001 |

OTHER PUBLICATIONS

"Screen Stopwatch", Google Creative Lab, released Jan. 2020, https://experiments.withgoogle.com/screen-stopwatch.

"Digital Wellbeing application", retrieved on Mar. 15, 2021, https://www.android.com/intl/en_ca/digital-wellbeing/.

"Manage how you spend time on your Android phone with Digital Wellbeing", retrieved Mar. 15, 2021, https://support.google.com/android/answer/9346420?hl=en#zippy=%2Cfind-out-how-much-time-you-spend-in-apps%2Climit-how-much-time-you-spend-in-an-app-each-day%2Creduce-interruptions%2Ctemporarily-pause-distracting-apps%2Cschedule-changes-to-get-ready-for-sleep%2Climit-how-much-time-you-spend-on-a-website-each-day%2Cfind-out-how-much-time-you-spend-on-websites.

Rahman, M., "Exclusive: Google is making Digital Wellbeing and Parental Controls an Android requirement", Oct. 7, 2019, https://www.xda-developers.com/google-digital-wellbeing-parental-controls-required-android/.

"What is Always-On Display (AOD) and how to use it?", last updated Sep. 21, 2020, https://www.samsung.com/oh/support/mobile-devices/what-is-always-on-display-aod-and-how-to-use-it/.

* cited by examiner

DEVICES AND METHODS FOR OPTIMIZING ELECTRONIC DEVICE USAGE BY VISUALIZING ACCESS HISTORY ON AN ALWAYS-ON DISPLAY

FIELD

This disclosure relates generally to electronic devices having a display and more specifically to devices and methods for optimizing electronic device usage by visualizing an electronic device's access history on an always on display of the electronic device.

BACKGROUND

Electronic devices, such as smartphones, televisions (TVs), tablet computers, and laptop computers have displays. When the device is in sleep or idle mode, some functionality is disabled, the processor runs at a slower clock speed, and the display is usually turned off all to save battery power. When the device is picked up and used, it exits sleep or idle mode.

Compulsive use of electronic devices can interfere with work, school and relationships. Excessive time is spent by some users on social media, playing games, repeatedly sending text messages, checking emails, or simply using mobile apps. Smartphone addiction is sometime colloquially known as "nomophobia" (fear of being without a mobile phone), often coincides with Internet overuse problem or Internet addiction disorder. Many efforts have been made to mitigate the electronic device usage addiction problem, and tools have been developed for that purpose. Most of these tools fall into two categories: tools which alert the users about their usage time, and tools which restrict access either to the entire electronic device or to a subset of applications or services.

Device usage mitigation tools which rely on a visualization module use charts and/or tables to indicate to users how long they have picked up their phone, how long they have used their phone and perhaps the times of the most frequent use. As an example of a usage visualization tool, reference is made to FIG. 1, which depicts an electronic device in the form of a smartphone 10 having a display 104. The home screen of the display 104 has a static wallpaper image 60 containing a stop usage direction message 62. The stop usage direction message 62 tells the user to stop looking at their phone, such as smartphone 10. The static wallpaper image 60 can be installed as the home screen wallpaper, the lock screen wallpaper or both. It is unlikely that this message is going to be very effective in reducing screen time with an electronic device. The user may know or think they have not spent much time on their device. Accordingly, the user may ignore the message. Additionally, the static wallpaper image 60 is only displayed when the electronic device is in use. If the electronic device was in sleep or locked mode, the static wallpaper image 60 is only seen after the electronic device is taken out of sleep or locked mode and the display is turned on. At that point, many users will not simply down the electronic device and refrain from using it.

As another example a usage visualization tool, reference is made to, FIG. 2, which depicts an electronic device in the form of a smartphone 10 having a display 104. The home screen of the display 104 has a dynamic stopwatch wallpaper 64 showing usage time 65. The dynamic stopwatch wallpaper 64 may be set as the default wallpaper by the mobile application Screen Stopwatch application by Google™. The dynamic stopwatch wallpaper 64 may be displayed on the home screen and shows the usage time 65. The dynamic stopwatch wallpaper 64 may optionally be shown on the locked screen as well. While the electronic device, such as smartphone 10, is unlocked and in use, the stop watch associated with the dynamic stopwatch wallpaper 64 increments time showing the user the amount of usage time 65 in real-time. If the dynamic stopwatch wallpaper 64 is shown on a locked screen, it will show the usage time 65 before the device was locked. However, a lock screen is only displayed when the electronic device is operated by the user. An electronic device which has been unused and enters sleep mode will have its displayed turned off. To enable the display, user action is required such as touching the touchscreen or pressing a key. It is, unlikely that once the user picks up the electronic device, and turns on the display, that they will put the device down because of a stopwatch value shown on the screen.

As another example a usage visualization tool, reference is made to, FIG. 3, which 6 depicts an electronic device in the form of a smartphone 10 having a display 104 displaying a screen time stats user interface 66. The screen time stats user interface 66 shows the total screen time 68, for a current day, and also breaks the screen time down by application. For example, for a current day, the screen time 67A for a first application ("Facebook™") is 46 minutes, the screen time 67B for a second application ("Chrome™") is 30 minutes, and the screen time 67C for a third application ("Wish™") is 15 minutes. A screen time daily goal 69 is also shown, giving the user an opportunity to compare their total screen time 68 with their screen time daily goal 69. The depicted screen time stats user interface is buried in a menu accessible through the settings option on Android™ devices. If the electronic device has been idle without use and enters sleep mode, then waking up the device and turning on the display would be needed before accessing the settings option. It is unlikely that once the user picks up the electronic device, wakes it up and turns on the display, that they will give up using it even assuming they would go through the trouble of delving into the settings menus to access the screen time stats user interface.

As yet another example of a usage goal setting and visualization tool which relies on a control module, reference is made to FIG. 4 in which an electronic device in the form of a smartphone 10 having a display 104 is displaying a screen time limiting user interface 70, which is in most cases part of the operating system and can be configured in one of the device setting menus. The screen time limiting user interface 70 allows a user to specify a screen time limit 72. When the screen time limit is used, the screen time limit user interface 70 displays a message indicating that the daily goal has been exceeded. However, if an electronic device is in sleep or locked mode, the user would need to pick up the device, turn on the display, unlock the electronic device (if necessary) and then go through the device settings menu to the screen time goal. In many cases, once the user has picked up the device, they would not check whether their screen time goal has been exceeded.

Device usage mitigation tools, which rely on a control module, allow users to set different types of limitations to limit access to different apps and services on their electronic device, such as their smartphone. As an example of a usage limitation tool which relies on a control module, reference is made to FIG. 5, which depicts an electronic device, in the form of a smartphone 10 having display 104 showing an app screen time limiting user interface 74 which allows setting an app screen time limit 76 for any of a plurality of apps installed on the electronic device. The app screen time limiting user interface 74 is typically part of the operating system accessible via the device settings user interface. When screen time for a particular app reaches the app screen time limit 76, the app stops working and the user is told that the limit is reached. When the electronic device is in sleep or locked mode, the user is unaware of the app screen time limits and needs to pick up the electronic device, turn on the display, unlock the device by entering the password, and then attempt to use a particular application only to find out that the app screen time limit for that application has been reached. Once the user has started using the device, it is unlikely they would stop using it and will likely extend any reached app time limit and continue using the device.

As another example of a usage limitation tool which relies on a control module, reference is made to FIG. 6, which depicts an electronic device showing an app filtering user interface 78 for an app filtering tool. The app filtering user interface 78 allows designating a plurality of apps 79 as allowable apps when the device is in a particular mode. App filtering does not give the user any advance warning when the electronic device is in sleep or locked mode.

In view of the drawbacks of the aforementioned methods and tools, there is a need for methods or systems for managing device usage and screen time that overcome at least some of the limitations of the aforementioned tools.

SUMMARY

Excessive use of smartphones or other similar electronic devices may lead to problems with those electronic devices. For example, a touch sensing system of a display may experience wear from excessive use. The smartphone battery is drained from the excessive use and needs to be charged frequently. Li-ion batteries' life is specified by the number of discharge/charge cycles. The more frequently the battery is discharged and charged the shorter its life. Many smartphones store information on flash memories which have a lifetime measured by program-erase cycles. Excessive use of applications which constantly write to the flash may also shorten its life since it leads to many program-erase cycles.

The present disclosure relates to devices and methods for optimizing electronic device usage by visualizing access history on a display of the electronic device while the device is in sleep mode. More specifically, the present disclosure provides systems and methods for collecting electronic device access history, deriving access statistics based on the collected electronic device access history, and displaying the access statistics on a display of the electronic device while the device is in sleep mode.

In one aspect of the present disclosure, there is provided an electronic device usage alert method. The method includes collecting electronic device access history on an electronic device, deriving electronic device access statistics from the electronic device access history, generating a visual representation of the electronic device access statistics, and displaying the visual representation on an always on display of the electronic device, which is in sleep or locked mode.

In some examples of the preceding aspect, collecting device access history comprises querying at least one system module to obtain event information comprised of device access events.

In some examples of the preceding aspect, collecting device access history comprises intercepting system messages including device access event data.

In some examples of the preceding aspect, obtaining the electronic device access statistics comprises calculating a usage time of the electronic device in a time period.

In another aspect of the present disclosure, there is provided an electronic device comprising a display having an always on display feature when the electronic device is in sleep, a processor coupled to the display, and a non-transitory memory coupled to the processor. The non-transitory memory is storing machine-executable instructions which, when executed by the processor, cause the electronic device to collect electronic device access history on the electronic device, obtain electronic device access statistics from the electronic device access history, generate a visual representation of the electronic device access statistics, and display the visual representation on the always on display.

In yet another aspect of the present disclosure, there is provided a non-transitory computer-readable medium having machine-executable instructions stored thereon. The machine-executable instructions, when executed by a processor of an electronic device, cause the electronic device to collect electronic device access history on the electronic device, obtain electronic device access statistics from the electronic device access history, generate a visual representation of the electronic device access statistics and display the visual representation on an always on display of a display of the electronic device, which is in sleep mode.

In some examples of the preceding two aspects, the machine-executable instructions which cause the electronic device to obtain electronic device access statistics comprise machine-executable instructions which cause the electronic device to calculate a usage time of the electronic device in a time period.

In some examples of the present disclosure, the electronic device access history comprises a plurality of device lock events and a plurality of device unlock events, and each unlock event of the plurality of device unlock events has an unlock event timestamp, and the usage time is a summation of a plurality of differences between each unlock event timestamp and each corresponding lock event timestamp.

In some examples of the present disclosure, the electronic device access history comprises a plurality of application open events and a plurality of application close events, and the electronic device access statistics comprises a screen time for at least one application.

In some examples of the present disclosure, each application open event of the plurality of application open events comprises an open event time stamp, each application close event of the plurality of application close events comprises a close event timestamp, and the screen time of a particular application is a difference between an open event timestamp and a corresponding close event timestamp.

In some examples of the present disclosure, the electronic device access history comprises a plurality of phone call initiation and a plurality of phone call termination events, and the electronic device access statistics comprise a total duration of voice calls in a time period, the total duration of voice calls being a summation of a plurality of voice call durations each being a difference between a phone call initiation timestamp of a phone call initiation event and a phone call termination timestamp of a corresponding phone call termination event.

In some examples of the present disclosure, the electronic device access history comprises a plurality of application install and a plurality of application uninstall events, and the electronic device access statistics comprise an alert that more applications are being installed than being uninstalled.

In some examples of the present disclosure, the electronic device access history comprises a plurality of photo or video capturing events, and the electronic device access statistics comprise a count of photos or videos captured in a time period.

The present disclosure provides for device usage optimization by providing an electronic device alerting method and system. The alerting method includes displaying visual information about the device access statistics which informs the user of the need to optimize and reduce either overall device usage or the use of certain applications. The information about the device access statistics are displayed on an Always On Display (AOD). Advantageously, the AOD is displayed when the user is not using the electronic device and the electronic device is in sleep mode. Accordingly, displaying the device access statistics on the AOD discourages further overall device usage as the user may decide not to pick up the electronic device to check the device access statistics. Displaying the device access statistics on the AOD also eliminates the need for parents to know the password for their children's electronic devices so that they can unlock the devices to review the usage statistics.

Reducing overall device usage or usage of certain application has many advantages. In one example, reducing the general use of the device reduces wear on the hardware, particularly on input devices such as the touchscreen display, the mouse, the touchpad, the keyboard and the like. Such devices have mechanical parts that are subject to wear from excessive use. As another example, reducing voice calls which utilize cellular wireless technology that rely on circuit switching reduces network congestion in cellular networks and reduces battery consumption on mobile phones. As another example, reducing the use of video streaming applications avoids network traffic collision and reduces processing resources which may cause an electronic device to heat up. As yet another example, alerting the user about the increase in the number of installed applications encourages the user to uninstall some applications. Keeping the number of applications installed under control reduces the amount of used storage on the electronic device thus reducing the risk of depletion of storage. Reducing the risk of storage depletion reduces the risk of operating system crash, instability or inefficiency. Reducing the number of photos or videos taken also keeps storage from being depleted. Additionally, capturing video or photos may use a flash or light that consumes the battery, so reducing the capturing of videos and photos improves battery life as well.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

In this disclosure, the terms "device usage", "usage time" and "screen time" are used interchangeably and refer to the electronic device being engaged by a user whether inputting data, listening to or watching media, or simply viewing content on a display of the electronic device.

The present disclosure relates to devices and methods for optimizing electronic device usage by visualizing access history on a display of the electronic device while the device is in sleep mode.

The present disclosure provides systems and methods for collecting electronic device access history, deriving access statistics based on the collected electronic device access history, and displaying the access statistics on a display of the electronic device while the device is in sleep mode.

Figure 1:
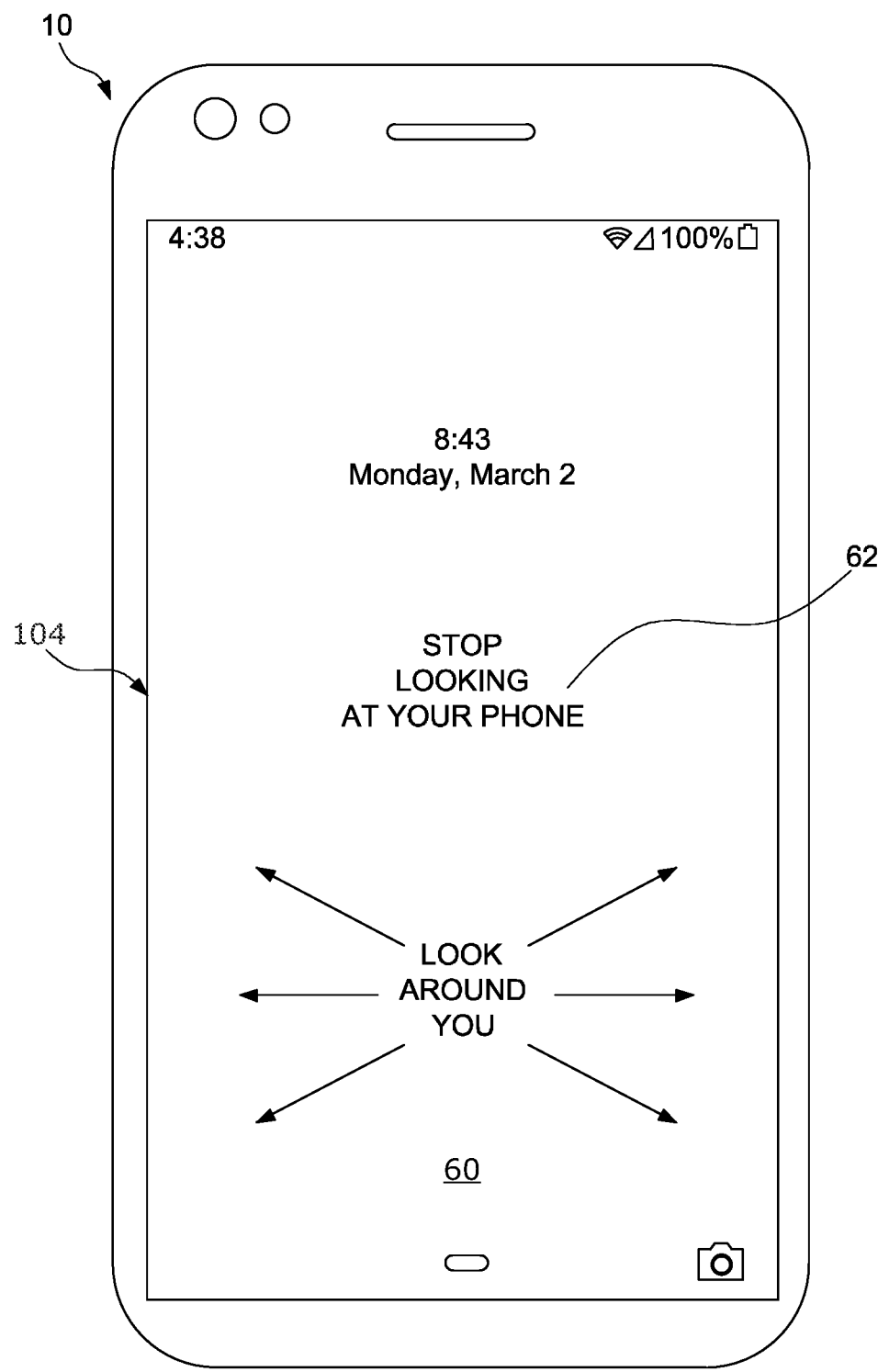
FIG. 1 depicts an electronic device in the form of a smartphone having a display, wherein the display is displaying a static wallpaper showing a stop usage direction message.
Figure 2:
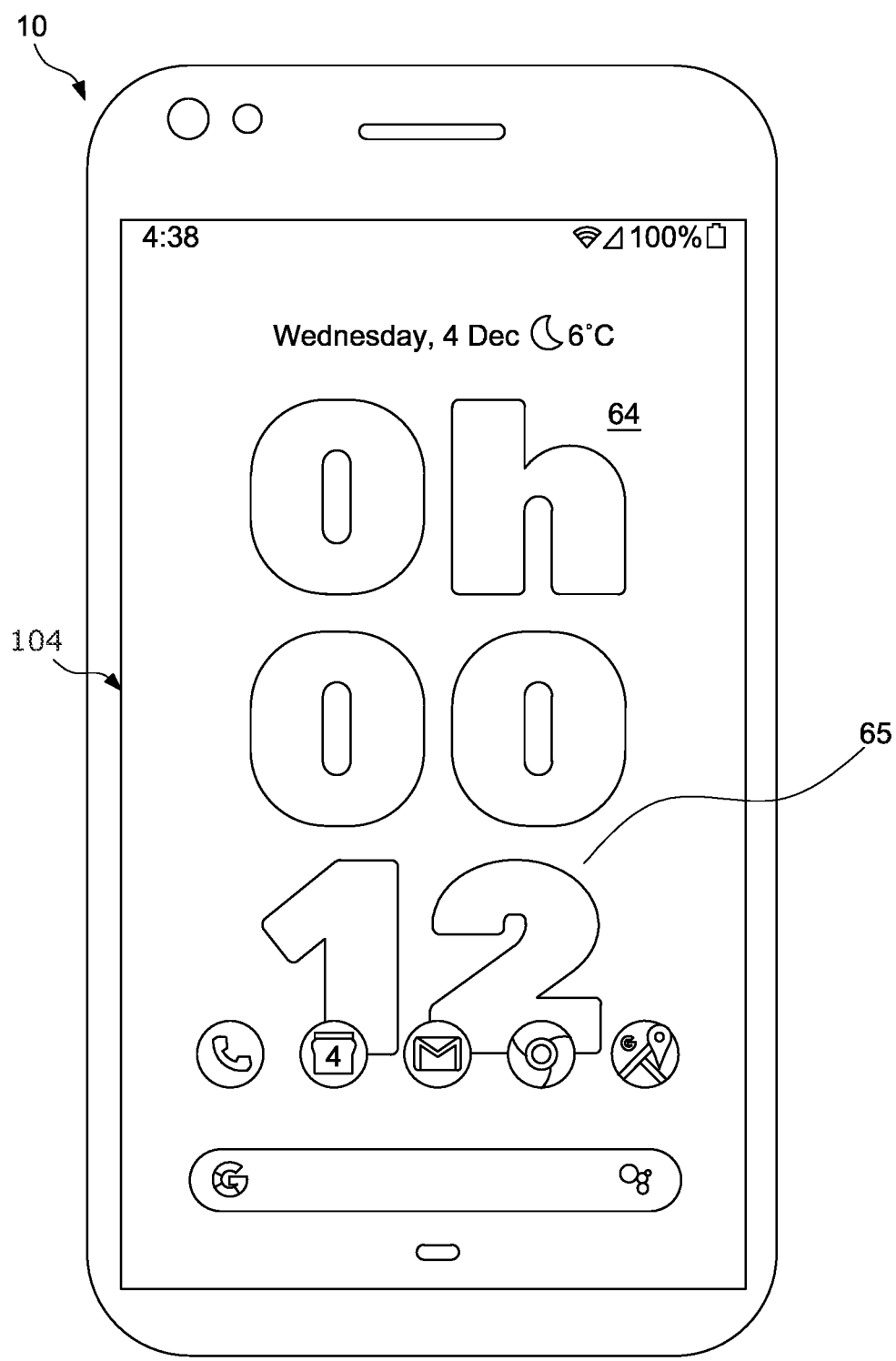
FIG. 2 depicts an electronic device similar to that of FIG. 1, wherein the display is displaying a dynamic stopwatch wallpaper showing a usage time.
Figure 3:
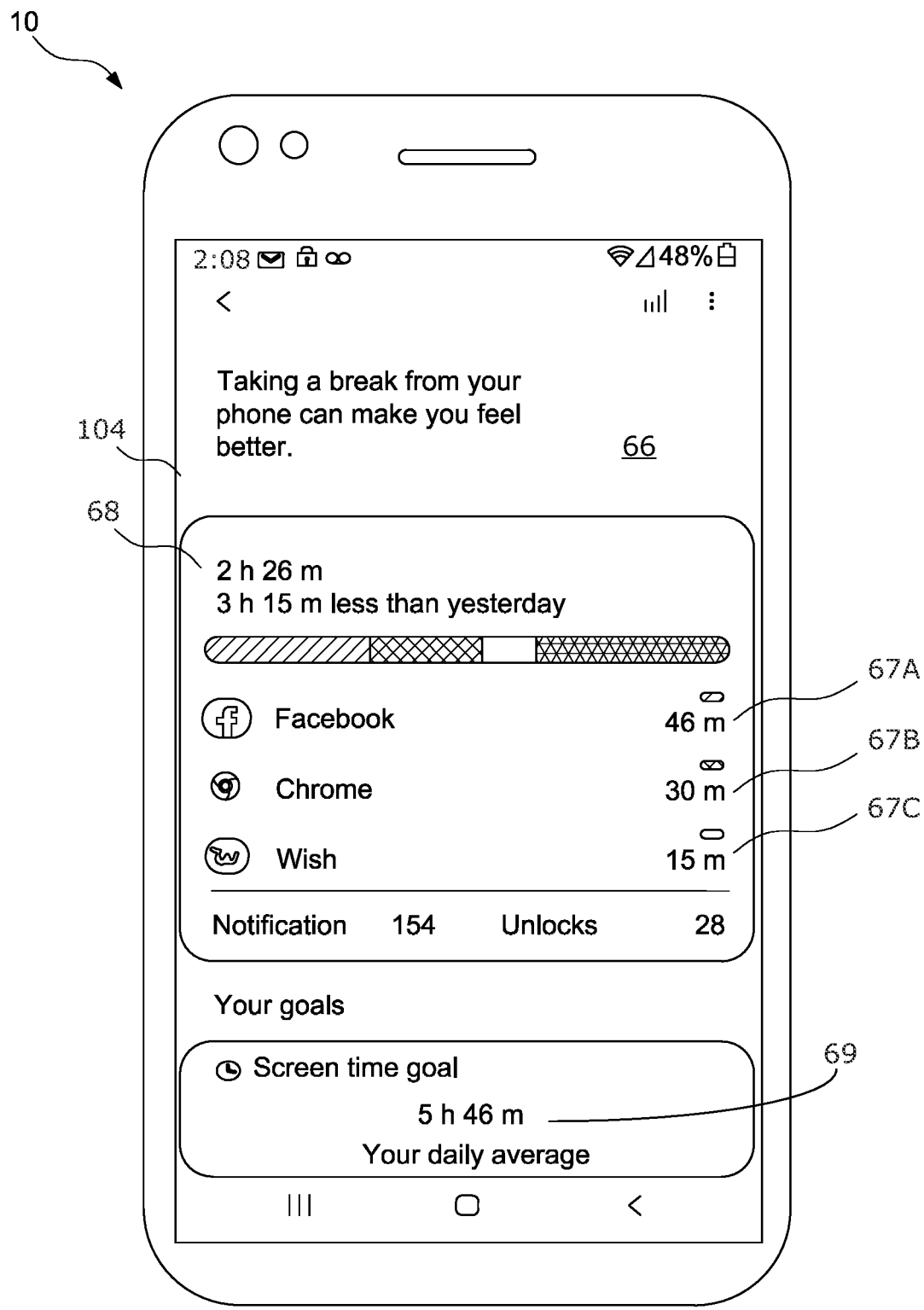
FIG. 3 depicts an electronic device similar to that of FIG. 1, wherein the display is displaying a screen time stats user interface, which may be part of the device settings user interface.
Figure 4:
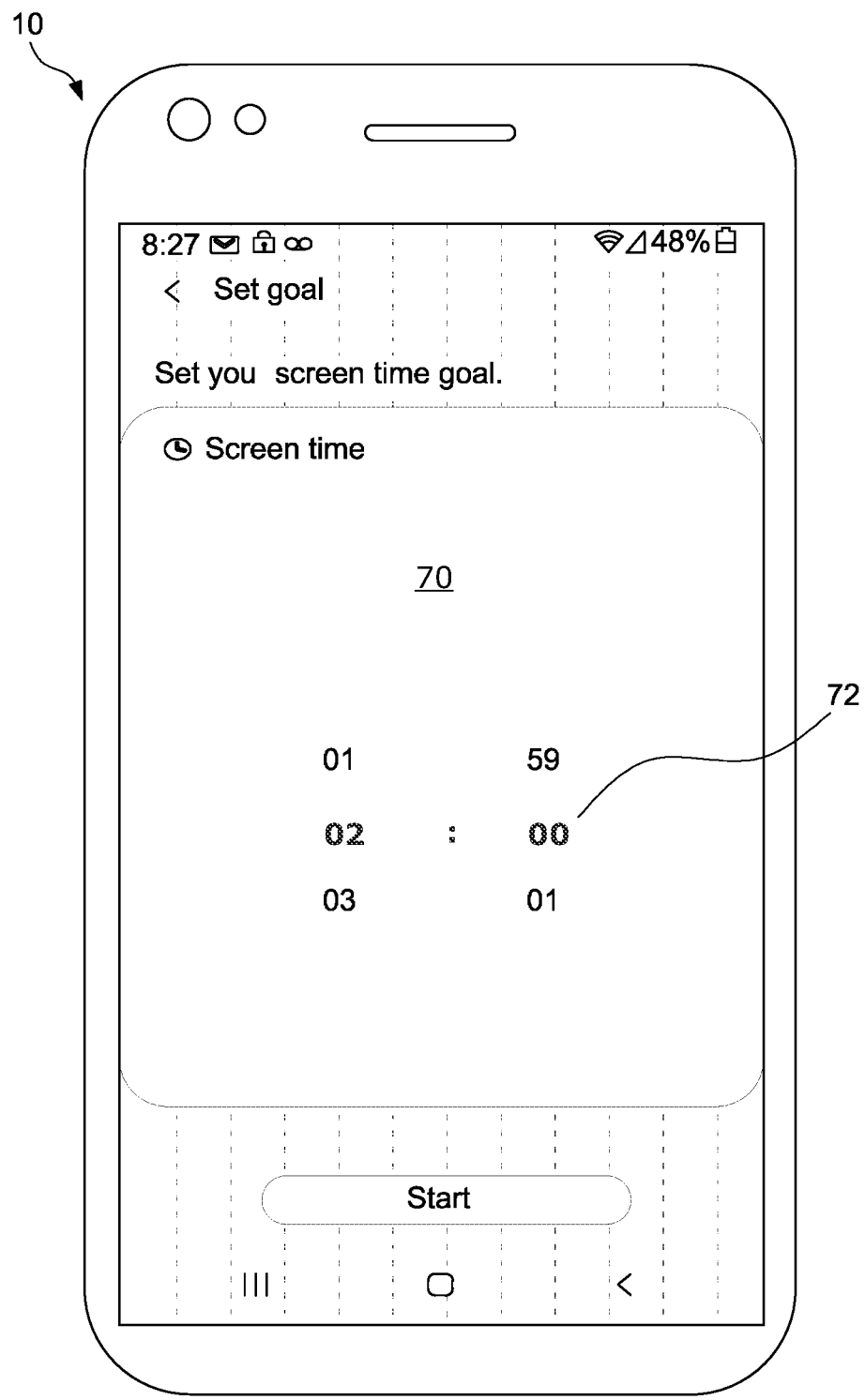
FIG. 4 depicts an electronic device similar to that of FIG. 1, wherein the display is displaying a screen time limiting user interface of a screen time limiting tool, which may be part of the device settings user interface.
Figure 5:
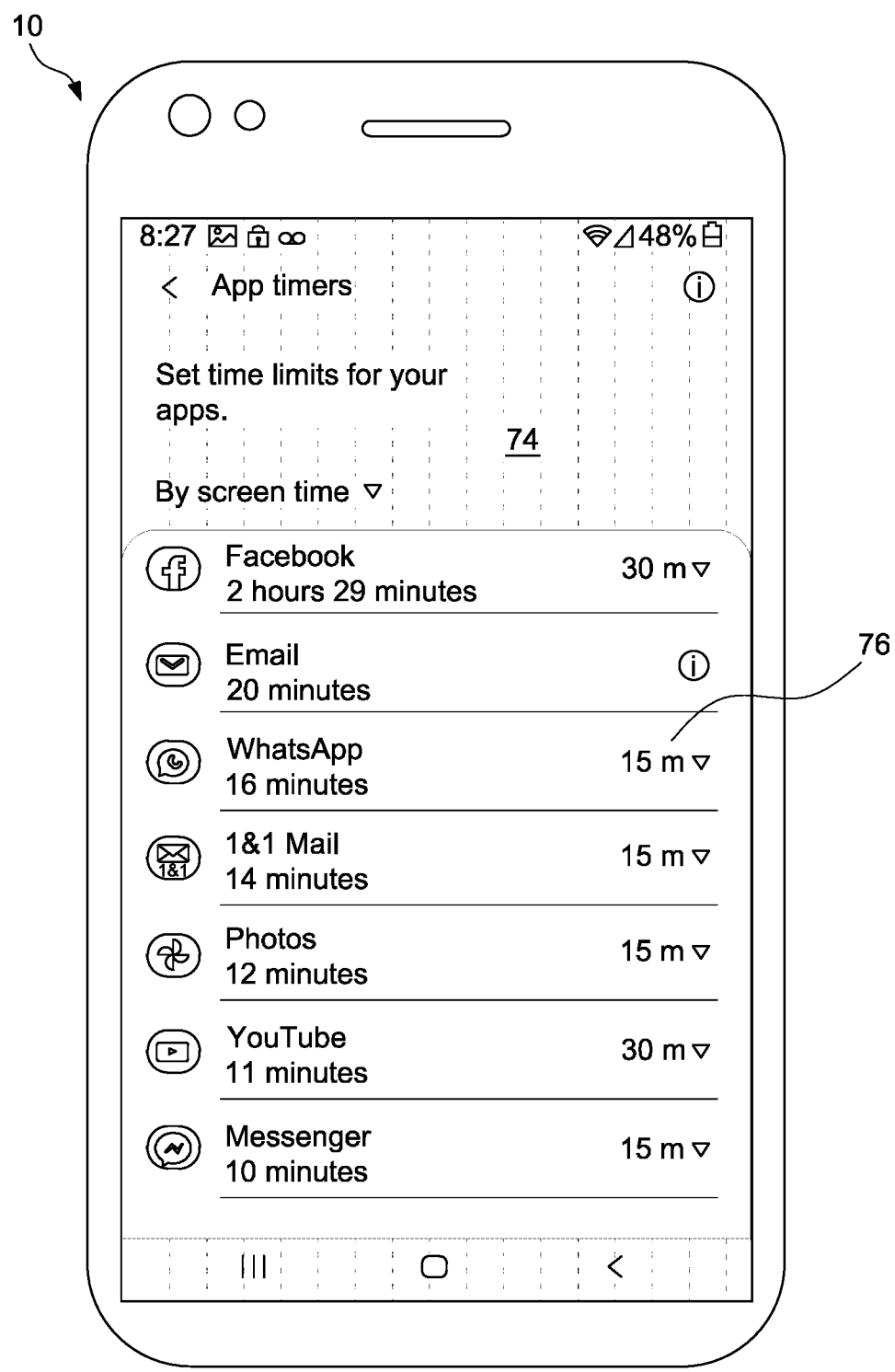
FIG. 5 depicts an electronic device similar to that of FIG. 1, wherein the display is displaying an app screen time limiting user interface, which may be part of the device settings user interface.
Figure 6:
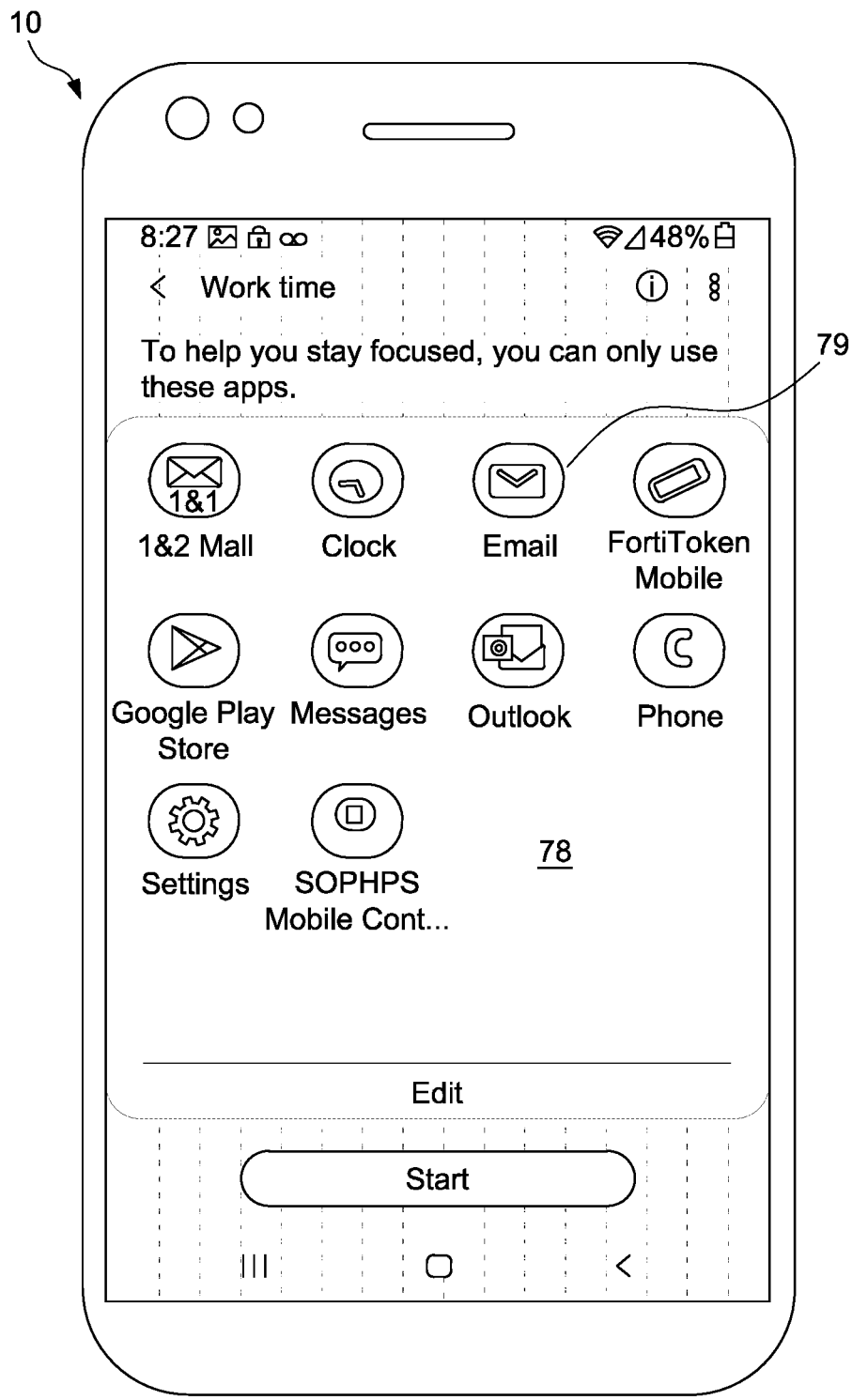
FIG. 6 depicts an electronic device similar to that of FIG. 1, wherein the display is displaying an app filtering user interface 78 for an app filtering tool, which may be part of the device settings user interface.
Figure 7:
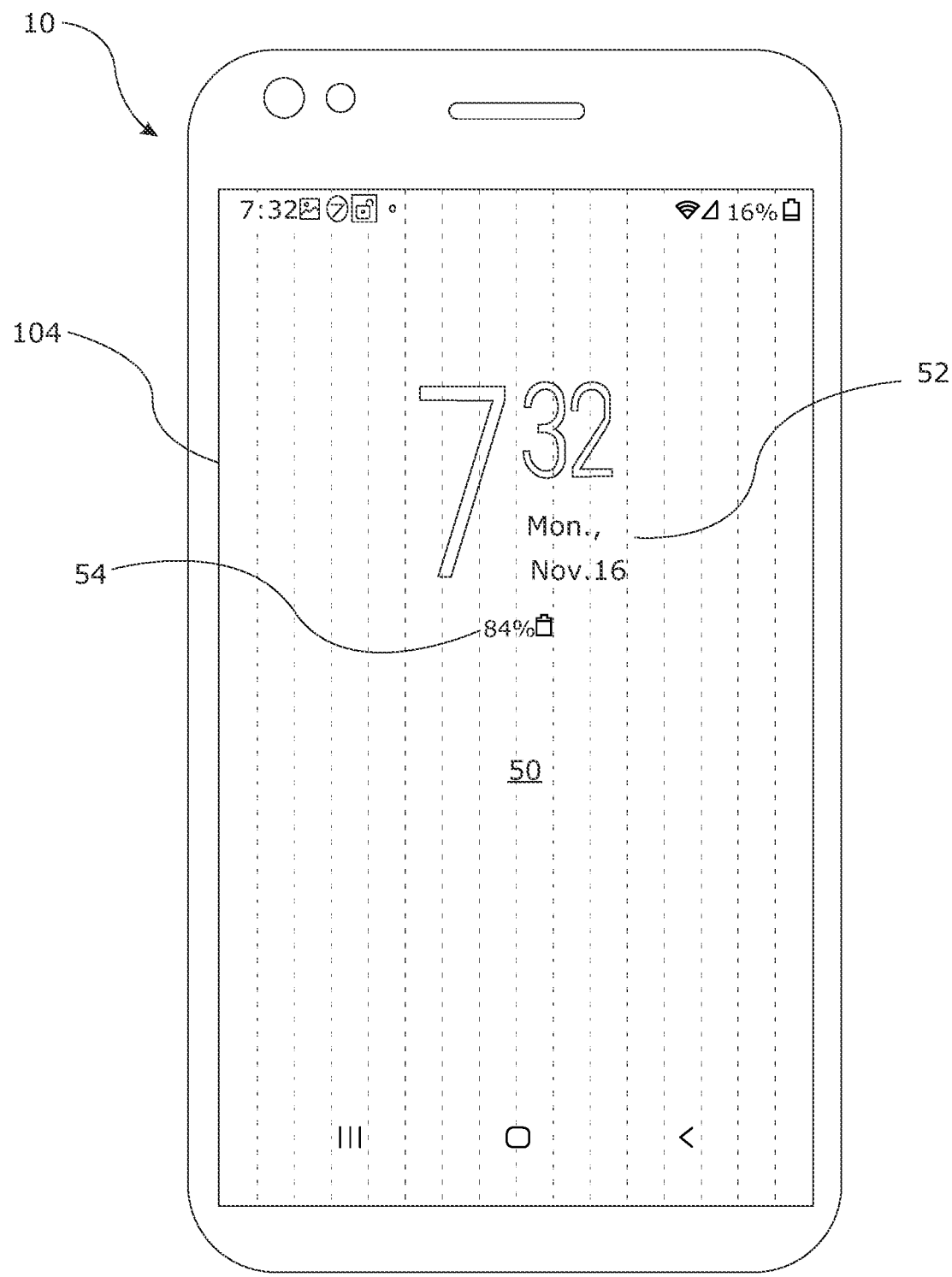
FIG. 7 depicts an electronic device in the form of a smartphone having a display displaying an Always On Display (AOD) showing the date, time, and battery status.
Figure 8:
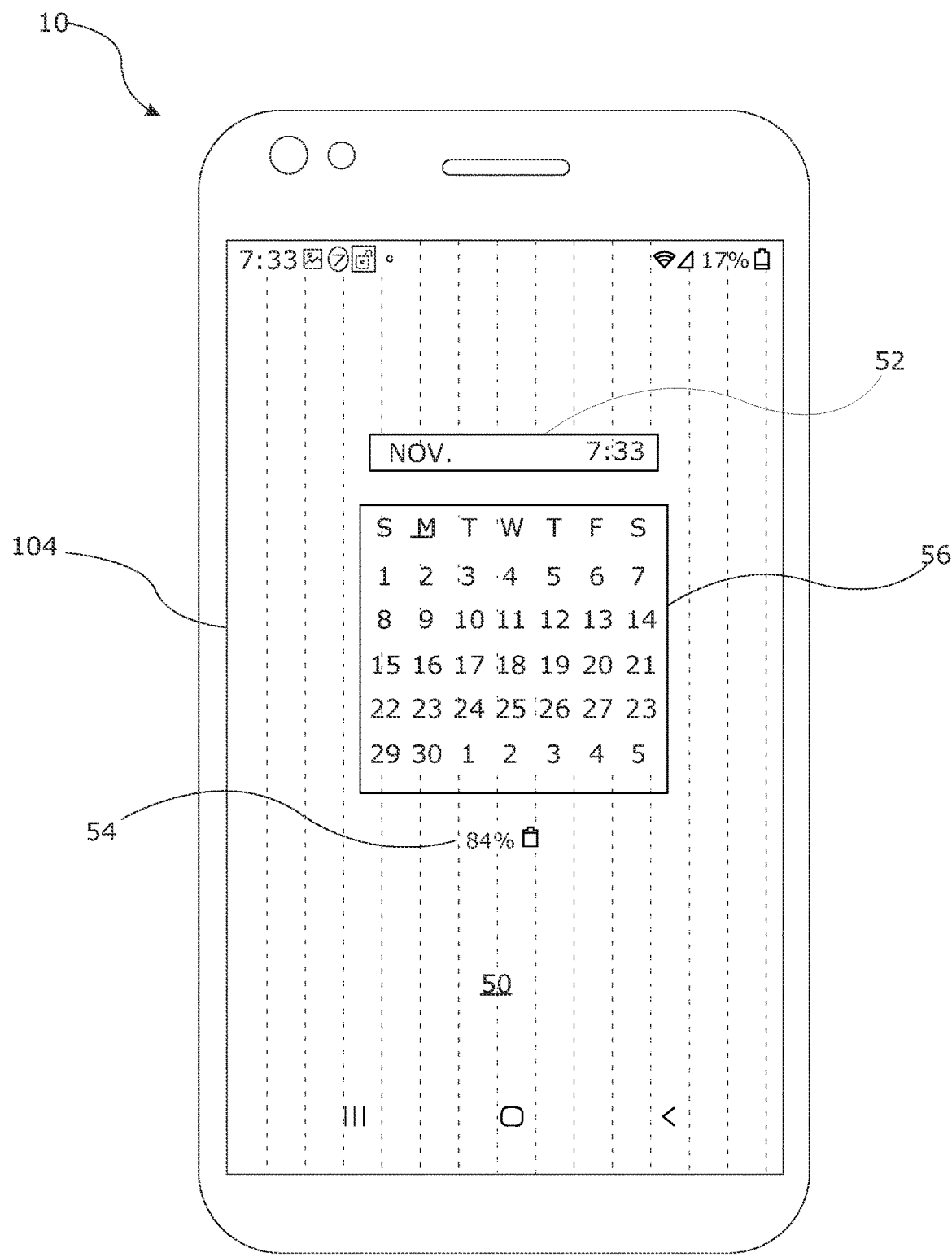
FIG. 8 depicts an electronic device having a physical keyboard and a display, wherein the display is displaying an AOD showing the date, time, month calendar, and battery status.
Figure 9:
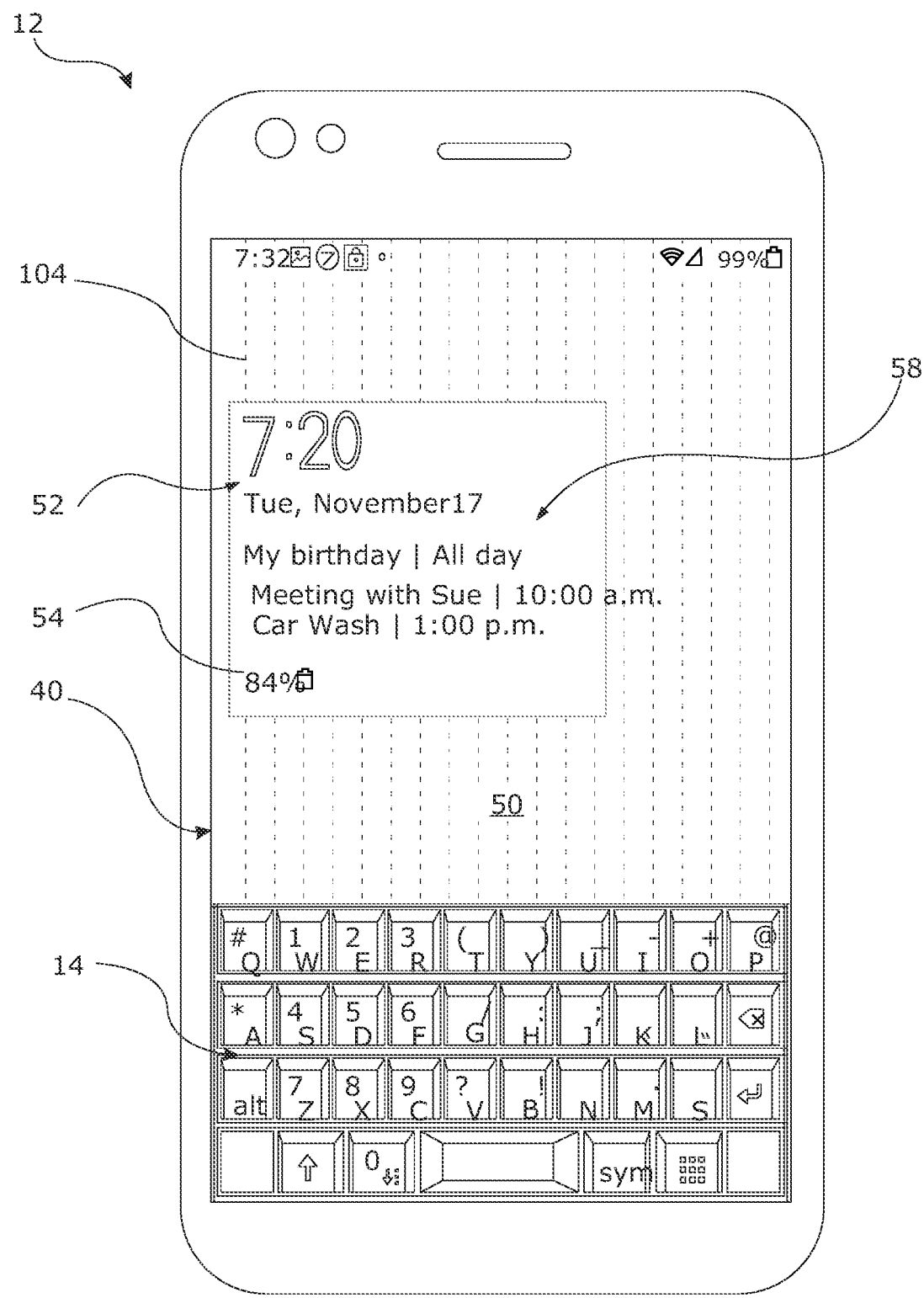
FIG. 9 depicts an electronic device in the form of a smartphone having a display and a keyboard, the display displaying an AOD showing the date, time, calendar appointments, and battery status.

An electronic device may be a smartphone, tablet computer, desktop computer, laptop computer, smart TV, e-book reader, or the like. Additionally, with recent advancement in IoT (Internet of Things) technology, many home appliances are now equipped with displays, have network connectivity, and are considered electronic devices for the purpose of this disclosure. Some electronic devices, when not used for some time, enter sleep mode. When the device is in sleep mode, some functionality is disabled, the processor runs at a slower clock speed, and the display is usually turned off all to save battery power. When the device is picked up and used, it exits sleep mode. One of the options in sleep mode is an always-on-display (AOD). The AOD is a smartphone feature that shows limited information while the phone is asleep. Theoretically, AOD can be implemented on any electronic device having a display. AOD is widely available on Android devices, as shown in FIGS. 7-9. As an example, FIG. 7 shows an electronic device in the form of a smartphone 10 having a display 104 displaying an AOD 50 including the date and time 52, and the battery status 54 of a the smartphone 10. As another example, FIG. 8 shows a smartphone 10 also having a display 104 displaying an AOD 50 including the date and time 52, a full month calendar 56 with today's date being highlighted, and the battery status 54 of the smartphone 10. As yet another example, FIG. 9 shows a smartphone 12 having a keyboard 14, and a display 40 displaying an AOD 50. The AOD 50 features the date and time 52, a number of calendar appointments 58, and the battery status 54 of the smartphone 12.

An AOD may also be referred to as an Ambient Display or an Active Display. An AOD keeps a limited portion of the display on during sleep mode. As discussed above, most AODs show the date, time and battery status although some can be configured to show other information such as calendar appointments, to-do lists, or music being played on the electronic device. Traditional displays such as conventional LCD displays consume too much power to have AOD implemented thereon. However, electronic devices featuring an Active Matrix Organic Light Emitting Diode (AMOLED) display can implement an AOD feature. In this case, an AOD uses a special capability of the AMOLED display that turns off black pixel thus greatly reducing the power consumption of the display when the AOD is displayed.

The access history of an electronic device comprises the historic data regarding interaction with the electronic device. The access history includes a record of the device being unlocked, launching and exiting any application on the device, phone calls made, text messages sent, social networking activity, photo taking activity using a built-in camera, installing or uninstalling applications, watching multimedia content, reading an electronic book, and the like. For an IoT-capable appliance, the access history depends on the function of the appliance. For example, an IoT-enabled coffee maker may be configured to display coffee consumption statistics on a display thereof.

The access statistics derived from the electronic device access history include the total times the device has been unlocked in a period of time, the total time device has been in use in a period of time, and the percentage of time the device has been in use in a period of time. Additionally, the device access statistics may include the total time spent using any particular application and the percentage of time the device has been used in any particular application. For smart TVs, the device access statistics may include per user total watching time or watching time classified by the multimedia content genre.

The access statistics are displayed on a display of the device while the device is in sleep mode. In the case of smartphones, the access statistics are displayed on an always-on display (AOD). In the case of smart TVs, the access statistics may be displayed on a screen saver user interface which is displayed when the TV has been idle for some time or when the TV is configured to a particular input that is not providing any content.

As FIGS. 12-16 show, the present disclosure describes methods mostly with reference to a smartphone 10 having an AOD 80 displayed while the smartphone 10 is asleep. However, it would be understood by those of skill in the art that the methods described are applicable to any electronic device having a display such as laptop computers, desktop computers, tablets, smart TVs, gaming consoles, and the like.

Figure 10:
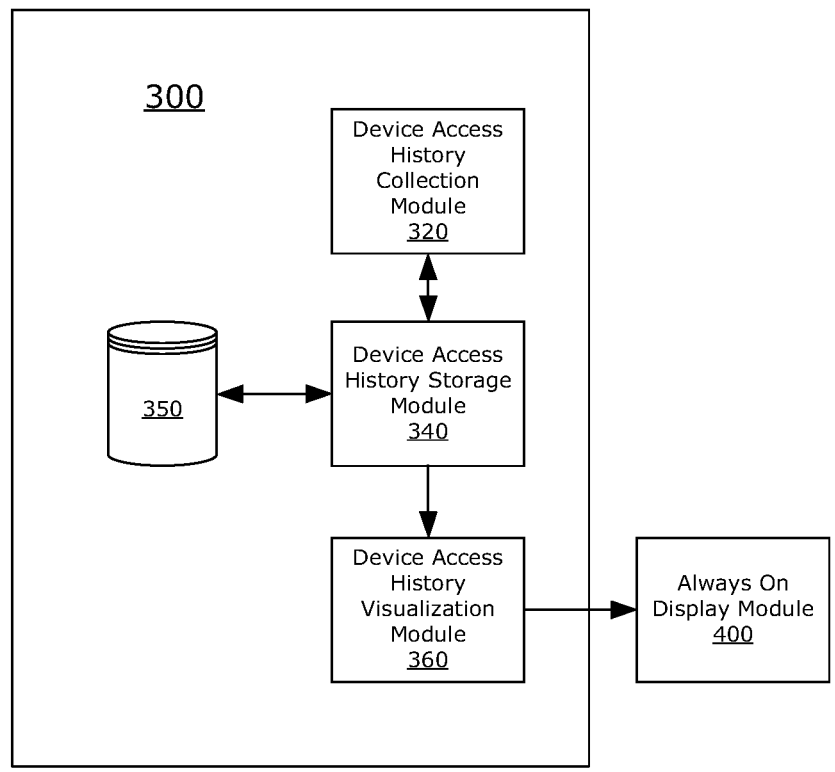
FIG. 10 depicts a system diagram of a device optimization system utilizing AOD, in accordance with embodiments of the present disclosure.

The present disclosure provides for device usage optimization by displaying visual information about the device access statistics which informs the user of the need to optimize and reduce either overall device usage or the use of certain applications. The methods presented involve a device usage optimization system, which is described with reference to FIG. 10. A device usage optimization system 300 in conjunction with an always-on-display (AOD) module 400 are depicted in FIG. 10. The device usage optimization system 300 is logically comprised of three components: a device access history collection module 320, a device access history storage module 340 and a device access history visualization module 360. The device access history storage module 340 may be coupled to a database 350 for storing device access history.

While FIG. 10 shows the device access history collection module 320, the device access history storage module 340, and the device access history visualization module 360 as individual blocks, it would be apparent to a person skilled in the art that some or all of these modules may be implemented as a single module. For example, the device access history storage module 340 may be an integral component with the device access history collection module. The database 350 is an optional component as the collected device access history collected by the device access history collection module may be stored in a file or in memory instead of being stored in the database 350. The device access history visualization module 360 may be integrated with the device access history storage module 340, or with the device access history collection module 320.

The device access history collection module 320 tracks and collects device access history, then uses them to derive device access statistics. The device access history collection module 320 may be implemented as a background service or process running on an electronic device, such as smartphone 10 or a smart TV 200. The device access history collection module 320 runs in the background and does not display any user interface. It runs concurrently with other applications so it may collect access history from the other applications. The device access history collection module 320 captures raw device access events from different modules running on an electronic device.

The device access events may be captured by a number of methods. For example, the device access history collection module 320 may call one or more application program interfaces (APIs) to query a system module and obtain event information comprised of device access events. In other examples, the device access history collection module 320 may intercept system messages that contain device access event data. Each collected device access event may have a set of properties associated therewith such as a timestamp, location, type, filename or a communication identifier, etc. As an example, with reference to FIG. 11, the device access history collection module 320 is depicted collecting device access event information from a number of system modules.

Figure 11:
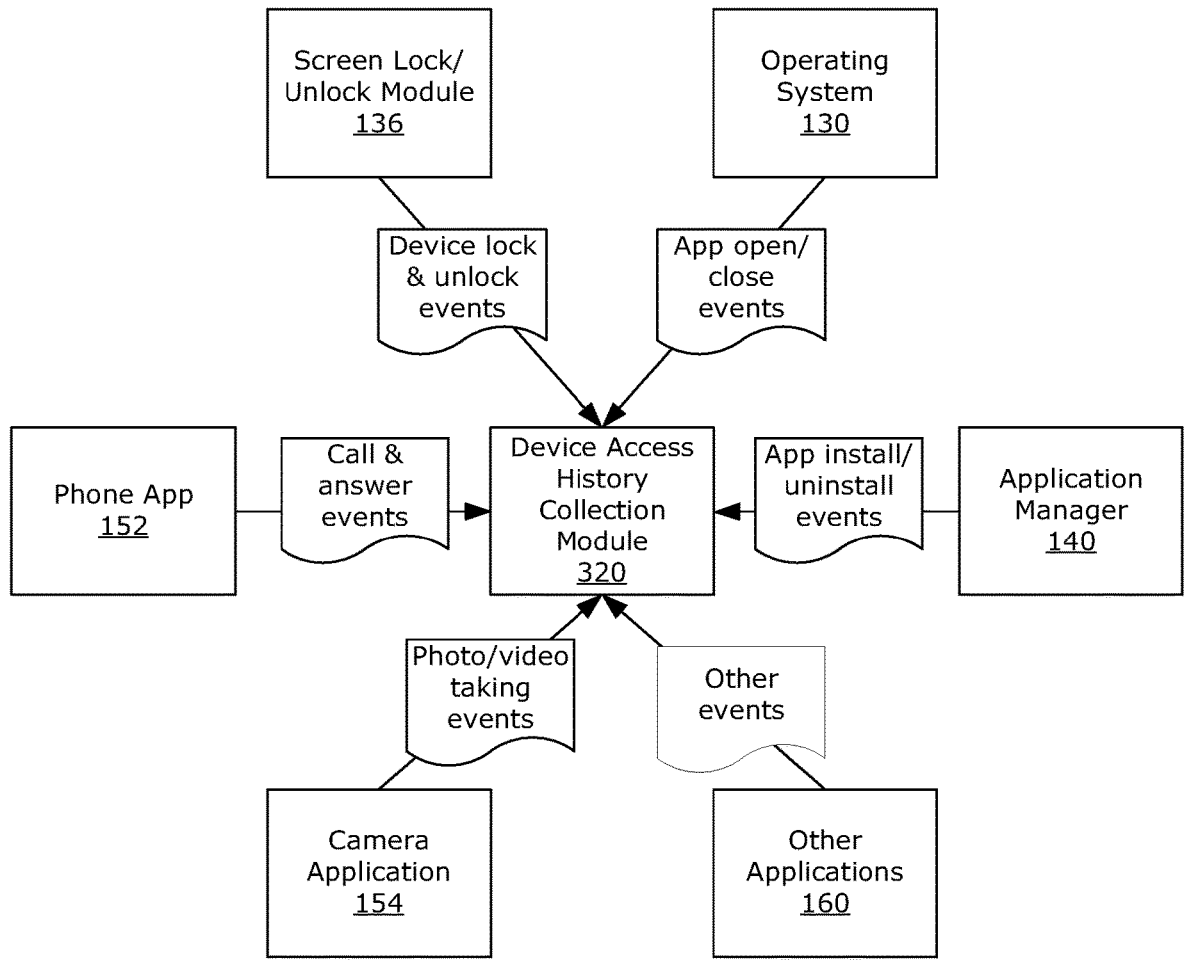
FIG. 11 is a system diagram depicting an electronic device access history allocation module gathering events from various components on an electronic device, in accordance with embodiments of the present disclosure.

The device access history collection module 320 receives device lock and device unlock events from the screen lock/unlock module 136, which is shown in FIG. 11. For example, whenever the electronic device is unlocked, the device unlock event along with the timestamp thereof are collected by the device access history collection module 320. The electronic device is unlocked by the user by pressing a particular key or touching a display. On security-enabled devices, a password, a PIN or a biometric input such as a fingerprint or face also need to be provided to unlock the device. When the device is left idle for some time without user interaction, it may self-lock. Alternatively, the device may be intentionally locked by the user by activating a particular key, icon or menu option. When the device is locked, the screen lock/unlock module 136 notes that the device is locked and records the timestamp of the lock event. The device access history collection module 320 collects the lock event including the timestamp thereof. Based on the device lock and device unlock events, the device access history collection module 320 can determine the total number of times the electronic device has been locked and unlocked in a time period such as in a day, a month or a year.

In some example embodiments, the device access history collection module 320 uses the device lock and unlock events to determine the usage time of the electronic device. For example, an electronic device may be configured to automatically lock after only 2 minutes of inactivity. If the device was unlocked, then locked after 2 hours and 5 minutes, then the difference between the timestamp of the device lock and the device unlock events presents a relatively accurate estimate of the use duration between the device unlock events and the corresponding device lock events. In other words, a use duration is obtained by subtracting the device unlock event timestamp of a device unlock event from the corresponding lock event timestamp of a subsequent corresponding device lock event.

The device access history collection module 320 may also compute the total use time of the electronic device in a time period such as a day, a month or a year. The total use time is obtained by summing use durations in a time period. For example, the use time in a day is obtained by the summation of the use durations in that day. In some embodiments, the device access history collection module 320 may compute a percentage of total time the electronic device has been in use in a particular time period such as a day, a month or a year. The percentage is determined by dividing the total use time by the time period. For example, if the device was in use for 6 hours on a particular day, then the device has a usage percentage of 25% (6 h/24 h). Similar usage percentages may be computed for weeks, months or years by summing the usage percentages during these durations.

The device access history collection module 320 may receive application open events and application close events from the operating system 130, as shown in FIG. 11. The application open and close events each contains, at least the name of the application and the timestamp of the event. For example, an application open event contains the application name and a timestamp indicating when the application was started. An application may be started (opened) in response to receiving a tap on an icon corresponding to an application, a voice command, or activating a menu item, for example. In some embodiments, the device access history collection module 320 intercepts API calls to the operating system 130 to open an application and records the application name and open event timestamp along with the open event. An application is exit typically in response to tapping an application close user interface element, a window is closed or an exit menu item is activated, for example. In some embodiments, when an application is exit, the device access history collection module 320 intercepts an API calls to the operating system 130 to close the application. In other embodiments, the device access history collection module 320 intercepts an exit message sent by application to the operating system 130 indicating that it is being exit. The exit message may indicate to the operating system 130 that the application no longer needs system resources allocated thereto. The device access history collection module 320 may be configured to intercept the exit message and use the information therein to record the application close event, along with the application name and close event timestamp. In some embodiments, the device access history collection module 320 may determine an application's use duration by subtracting an open event timestamp of the application from the corresponding close event timestamp of the corresponding application close event. This is a reasonable assumption on a smartphone with a small display in which a single application takes up the entire display's viewing area. On other electronic devices, such as desktop computers, where an operating system such as Windows or Linux permits the display of multiple application windows, other events may be needed to determine which application is being used. On such operating systems, typically one application window is active and is said to have the focus. In such embodiments, the device access history collection module 320 may be configured to record the focus setting events for each application window. An application use duration may be determined by subtracting the timestamp of the event indicating that the application window has gained focus from the timestamp of the event indicating that the application window has lost focus.

In some embodiments, installing new applications on the device is also collected, by the device access history collection module 320. For example, the device access history collection module 320 may be configured to record new app installation events by being coupled to the application manager 140. When a new application is installed the application manager 140 may provide the application name, size, and a timestamp for the installation to the device access history collection module 320 in an application install event. Similarly, when an app is uninstalled, the application manager 140 provides an application uninstall event to the device access history collection module 320. If more applications are getting installed than uninstalled, the storage unit(s) 178 on the device, such as built-in flash memory, may be depleted. Accordingly, alerting the user about the number of installed applications or that more application install events than application uninstall events have been recorded, reduces the risk of storage depletion. Storage depletion may hinder the ability of the operating system 130 to create temporary files which may cause it to lock up, crash or run more slowly.

Knowing the use durations of various applications the device access history collection module 320 may derive a number of useful statistics that assist users in optimizing or reducing their device use. For example, device access history collection module may determine the total use durations for a given application in a certain time period by summing the individual use durations for that application during that time period. For example, if the email application is used for 40 minutes in the morning, for 75 minutes in the afternoon and for 30 minutes at bedtime, then the total use time for the email application in the time period of one day is 2 hours and 25 minutes. The device access history collection module 320 may compute the daily use duration statistics for all applications which run on an electronic device. In some embodiments, the used statistics for all applications are sorted and the top X (e.g. top ten) applications in terms of daily use are identified. Additionally, the percentage of time the user has spent on a given application may be derived. For example, the device access history collection module 320 may sum all the use durations for all applications. Then the percentage of that use per application may be derived. For example, if the Facebook™ application is used for 1.5 hours, and the total applications are used for 4.5 hours, then Facebook™ accounts for nearly ⅓ or 33.33% of all application use time.

There are other factors that may need to be considered when collecting device access history and providing statistics which may be used to inform the user so as to reduce device use addiction. These factors include processing performance, power consumption, overheating, operating cost, and network bandwidth usage. For example, when an electronic device is used in making voice phone calls, the phone is operating in circuit switched mode. In this mode, the communications radio module is constantly on, the transceivers are activated, and power amplifiers are powered-up. In some cases, such modules may heat up or cause the battery to be depleted at a higher rate. As such, it may be desirable to provide usage statistics related to voice calls to help curb or at least reduce the duration of voice calls. In some embodiments, the device access history collection module 320 is connected with the phone app 152 on a smartphone, for example. The device access history collection module 320 receives call and answer events from the phone app 152. Specifically, the device access history collection module 320 receives a plurality of phone call initiation events, a plurality of phone call answer events and a plurality of phone call termination events. Accordingly, device access history collection module 320 can determine the duration of each voice call made on the electronic device, such as smartphone 10, by subtracting the call initiation timestamp of a phone call initiation or answer event from the call termination timestamp of a corresponding phone call termination event. The device access history collection module 320 can then determine the total duration of voice calls in a time period, such as a day, a month or a year. Furthermore, each call event may contain the telephone number of the other party in the call. Accordingly, the device access history collection module 320 can determine the top X phone numbers which the electronic device initiates calls to, or receives calls from. This information may be of assistance to the user. For example, it may be better to call some users from a landline since the calls are usually lengthy.

Capturing (taking) photos or videos with a built-in digital camera 102 on a portable electronic device, such as a smartphone, has some performance implications. For example, photos and videos consume persistent storage such as the built-in flash memory or an external secure digital input output (SDIO) card. When memory, particularly the built-in flash memory, is depleted the operating system may encounter performance problems as it becomes unable to save temporary files. For example, as a result of flash memory depletion, the operating system may issue an error message indicating its inability to start certain applications. Furthermore, photos and videos taken in areas with low lighting will cause a built-in flash to turn on. The flash consumes high power and may, therefore, deplete the battery charge quickly. Accordingly, in some example embodiments, the device access history collection module 320 may be configured to receive photo and video capturing events from a camera application 154. The photo and video capturing events may contain properties such as the size of the resulting media file. Video capturing events may contain a type indicating whether the event was a video start capture event generated at the beginning of taking the video or at the a video stop capture event, generated when taking the video was terminated. A timestamp in the video capturing events allows the device access history collection module 320 to determine the length of a video by subtracting the video stop capture event timestamp from the video start capture event. The device access history collection module may then derive statistics from the collected photo and video taking event data, in order to provide information about any excessive use. For example, the total number of photos and videos taken in a given time period may be determined. Additionally, the top X videos in terms of size may be identified, thus providing an option for the user to move or delete them to free up some memory.

The device access history collection module 320 may also be configured to receive other events from other applications 160. For example, the device access history collection module 320 may be configured to receive events when media streaming applications such as Netflix are streaming videos. When videos are streamed, the electronic device consumes battery power due to the active network connection, the processing of the video being streamed and the activation of the display. The device access history collection module 320 is, therefore, customizable to capture events from a host of applications for tracking usage thereof and derive useful statistics. In case of devices including multiple users, the user name may be included with the gathered device access history. For example, for a Netflix™ or a Youtube™ application, the user name may be associated with the streaming activity in order for each user to know their device time statistics.

The device access history collection module 320 passes the collected device access history data and the derived usage statistics to the device access history storage module 340. The device access history storage module 340 may store the device access history data and the derived usage statistics in a file, a data structure in memory, or in a database 350, etc.

The access history statistics derived from the device access history events are then prepared in visual form by the device access history visualization module 360. The access history statistics may be prepared, by the device access history visualization module 360, in the form of a combination of text, charts, tables or drawings, etc. In some embodiments, the text, charts, tables or drawings are further decorated with different styles of color, size and layout. The device access history visualization module selects the visual form for presenting the device access statistics based on a design rationale and the display technology available for displaying the statistics. For example, as shown in FIG. 10, the device access history visualization module 360 is coupled to an AOD module 400. In this example embodiment, the AOD technology may be communicated to the device access history visualization module 360. The device access history visualization module 360 selects the visual form of displaying the device access statistics based on the AOD technology communicated by the AOD module 400. For example, an AMOLED (active-matrix organic light-emitting diode) display can only support gray-scale visualization. Therefore, if the AOD module 400 reports an AMOLED display type, the device access history visualization module 360 prepares a gray-scale visual form of the device access history statistics. If the AOD module 400 reports a display type which supports color on the AOD, the device access history visualization module 360 prepares a colorful visualization of the device access statistics. In some embodiments, the AOD is only capable of displaying textual content. Accordingly, the device access history visualization module prepares only textual visualization of the device access statistics. In other embodiments, the AOD is capable of displaying graphical content. Accordingly, in response to receiving an indication that the AOD is capable of displaying graphical content, the device access history visualization module prepares textual and graphical visualization of the device access statistics. An AOD may be implemented on a number of display technologies such as OLED, AMOLED, LCD, LED, mini-LED, micro-LED and E-ink. However, only display technologies which have low power consumption are practical for battery-operated electronic devices. On the other hand, electronic devices powered via a wall outlet, such as a Smart TV, may employ any technology for its AOD (screen saver).

Examples will be presented below for visualizing a device access history statistics on an AOD 80 of a smartphone 10. It would, however, be apparent to persons skilled in the art that those are non-limiting examples and that other possible variants are possible without departing from the scope of the invention.

Figure 12:
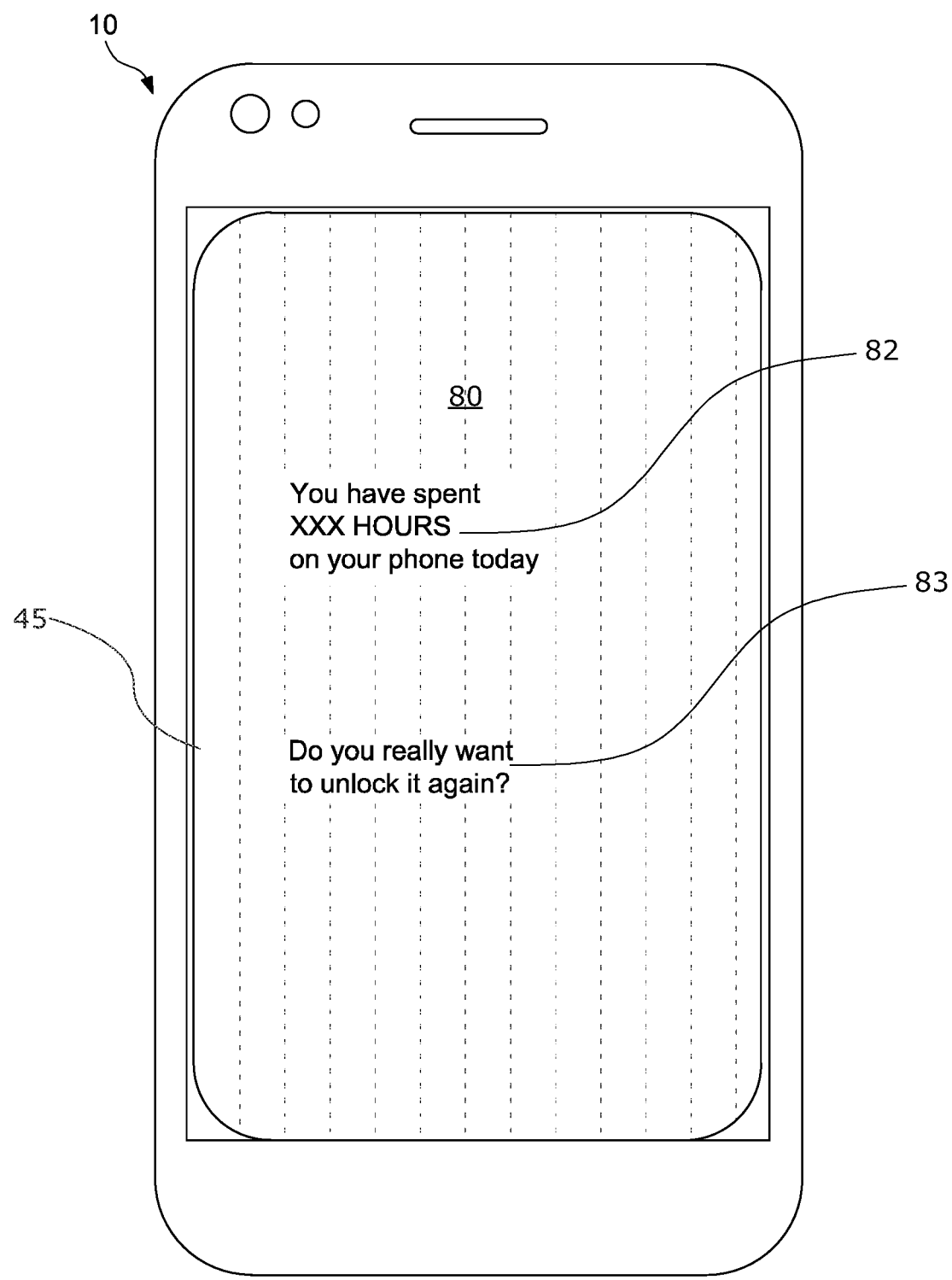
FIG. 12 depicts an electronic device similar to that of FIG. 7, wherein the display is displaying an AOD including a screen time message, in accordance with embodiments of the present disclosure.

Different examples of visualization of the device access statistics are show with reference to FIGS. 12 to 16. FIG. 12 depicts an electronic device in the form of a smartphone 10 having a display 104 on which there is shown an AOD 80. The AOD 80 is displaying a screen time message 82 indicating the total number of hours the smartphone 10 was used for on the current day. Additionally, a secondary message is directed to user simply asking, rhetorically, if the user would like to unlock the device again. By showing the total screen time for the current day, it is hoped that the user would refrain from unlocking the electronic device and put it down.

Figure 13:
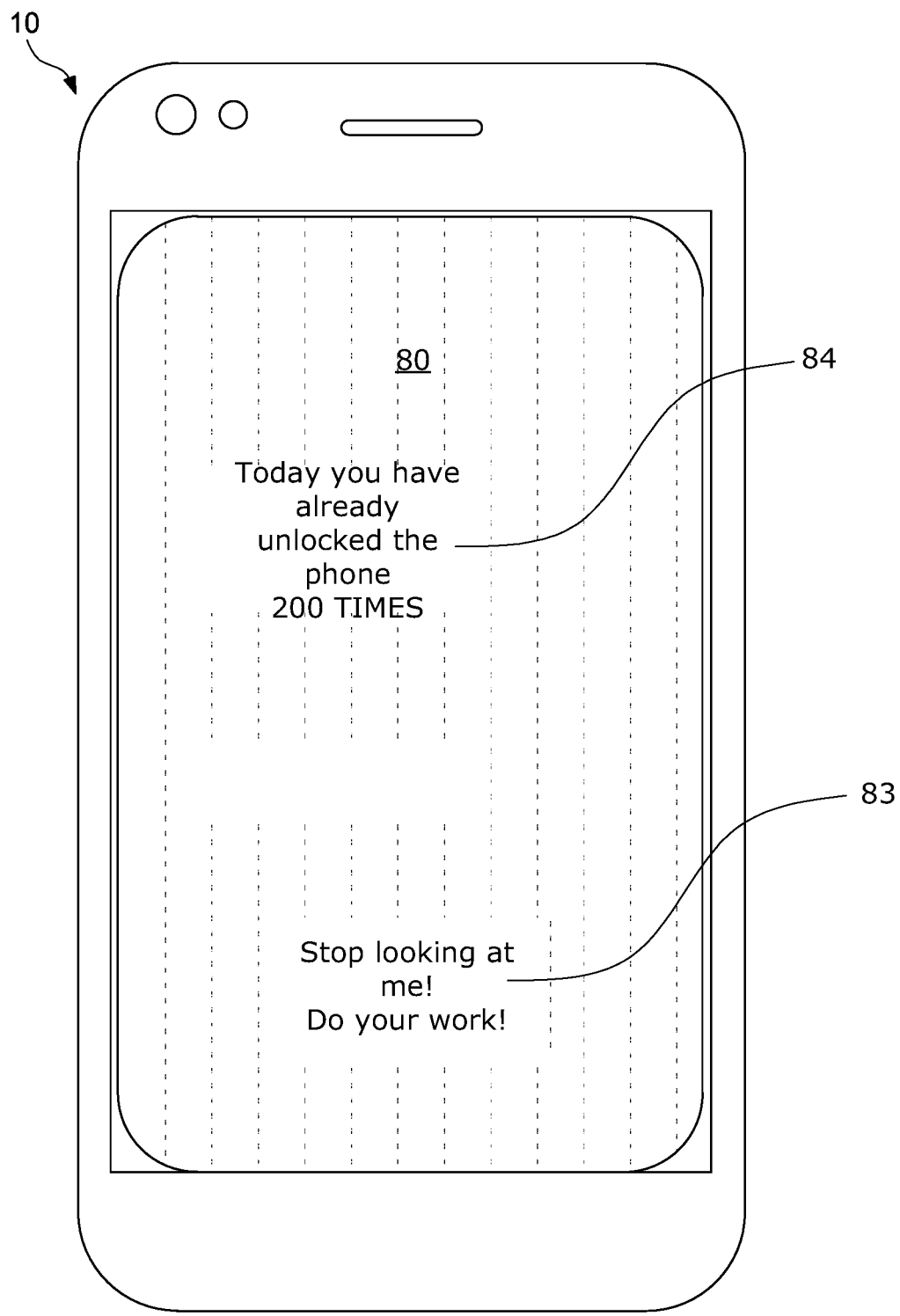
FIG. 13 depicts an electronic device similar to that of FIG. 7, wherein the display is displaying an AOD including an unlock count message, in accordance with embodiments of the present disclosure.

FIG. 13 depicts another example of an AOD 80 on a smartphone 10. The AOD 80 displays an unlock count message expecting the user to refrain from unlocking and using the smartphone 10 when the unlock count is high. A secondary message 83 is shown, which in this case is simply directing the user to stop looking at the display of the smartphone 10.

Figure 14:
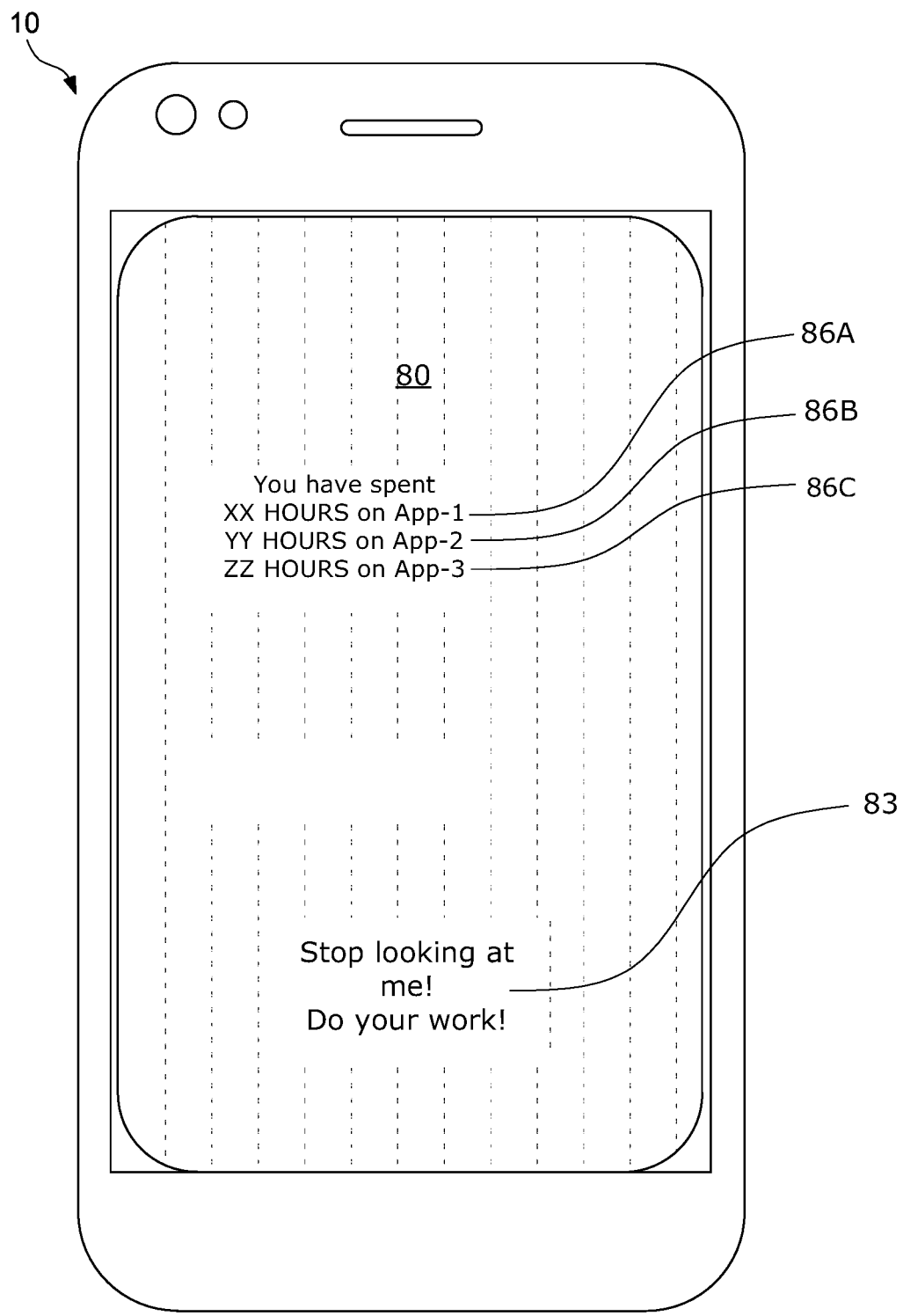
FIG. 14 depicts an electronic device similar to that of FIG. 7, wherein the display is displaying an AOD including a plurality of app screen time messages, in accordance with embodiments of the present disclosure.

FIG. 14 depicts yet another example of an AOD 80 on a smartphone 10. The AOD 80 displays an app screen time message comprising a plurality of app screen time statistics 86A, 86B and 86C corresponding to three applications termed App-1, App-2 and App-3. The secondary message 83 shown is similar to the one from FIG. 13.

Figure 15:
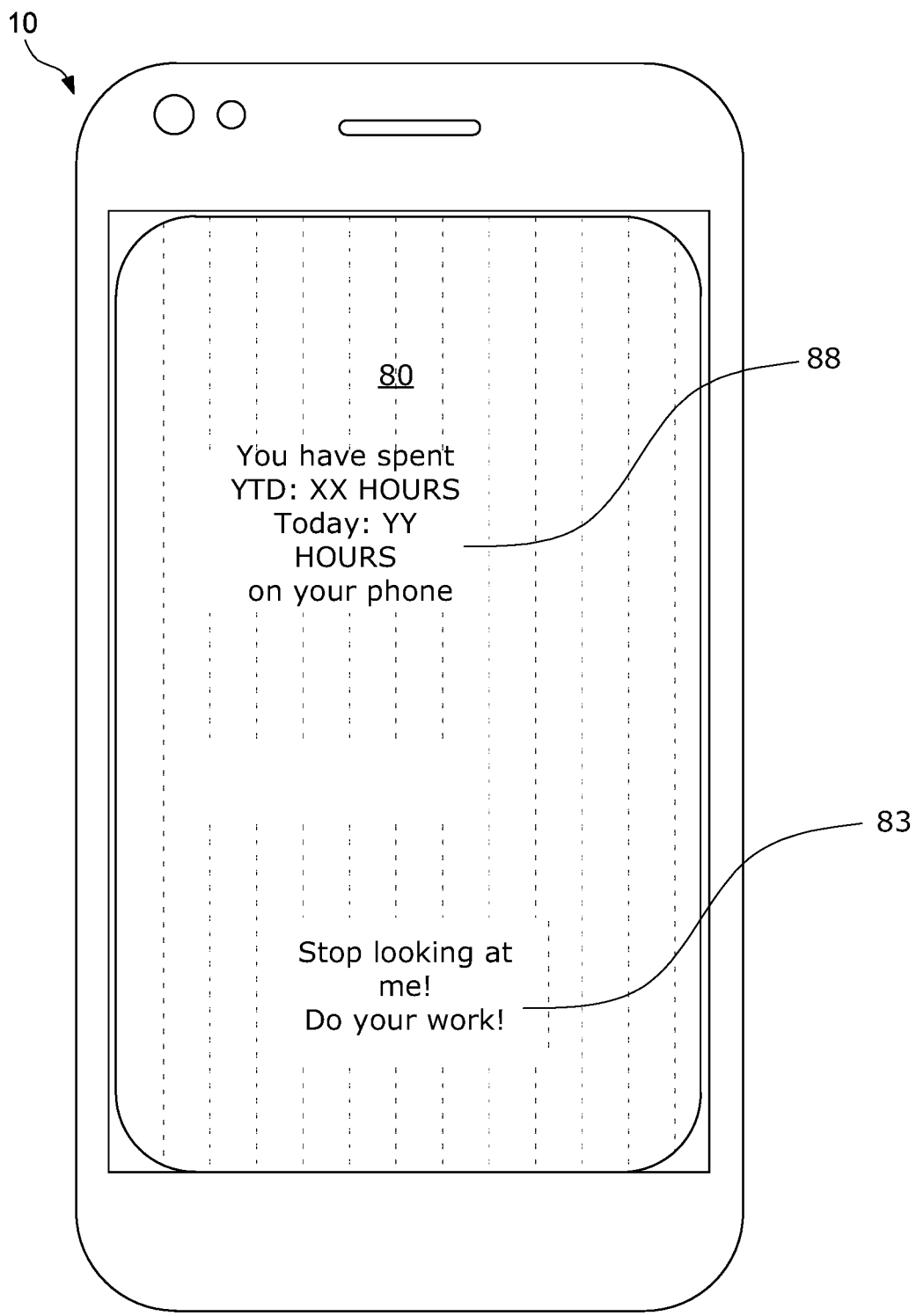
FIG. 15 depicts an electronic device similar to that of FIG. 7, wherein the display is displaying an AOD including a current and year-to-date screen time message, in accordance with embodiments of the present disclosure.

FIG. 15 depicts a further embodiment of an AOD 80 on a smartphone 10. The AOD 80 displays a current and year-to-date screen time message 88. The year-to-date screen time is determined by adding all daily screen times from January 1$^{st}$ of the current year until the current date.

Figure 16:
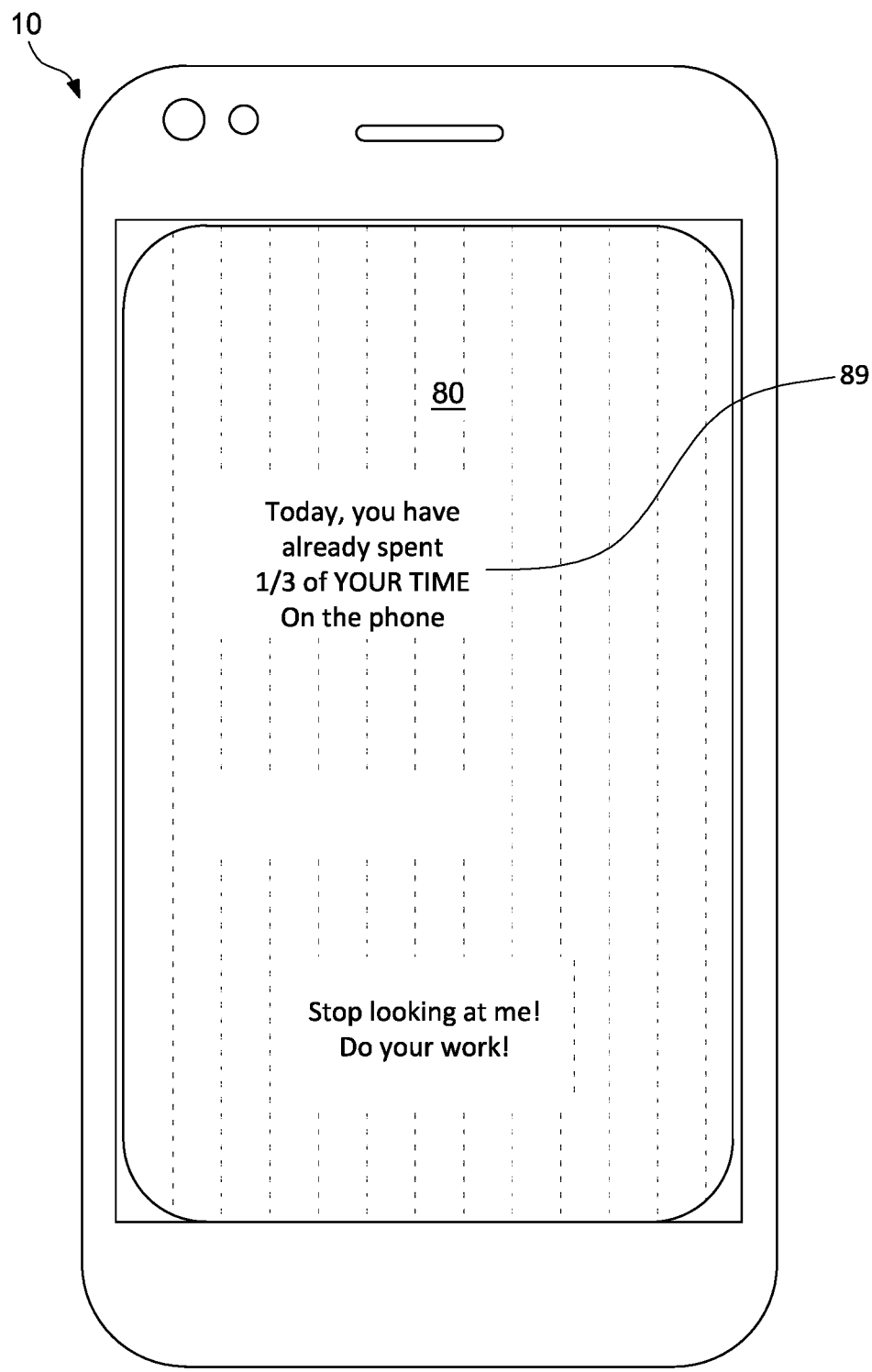
FIG. 16 depicts an electronic device similar to that of FIG. 7, wherein the display is displaying an AOD including a screen time percentage message, in accordance with embodiments of the present disclosure.

FIG. 16 depicts another embodiment of an AOD 80 on a smartphone 10. The AOD 80 shows a screen time percentage message 89.

Figure 17:
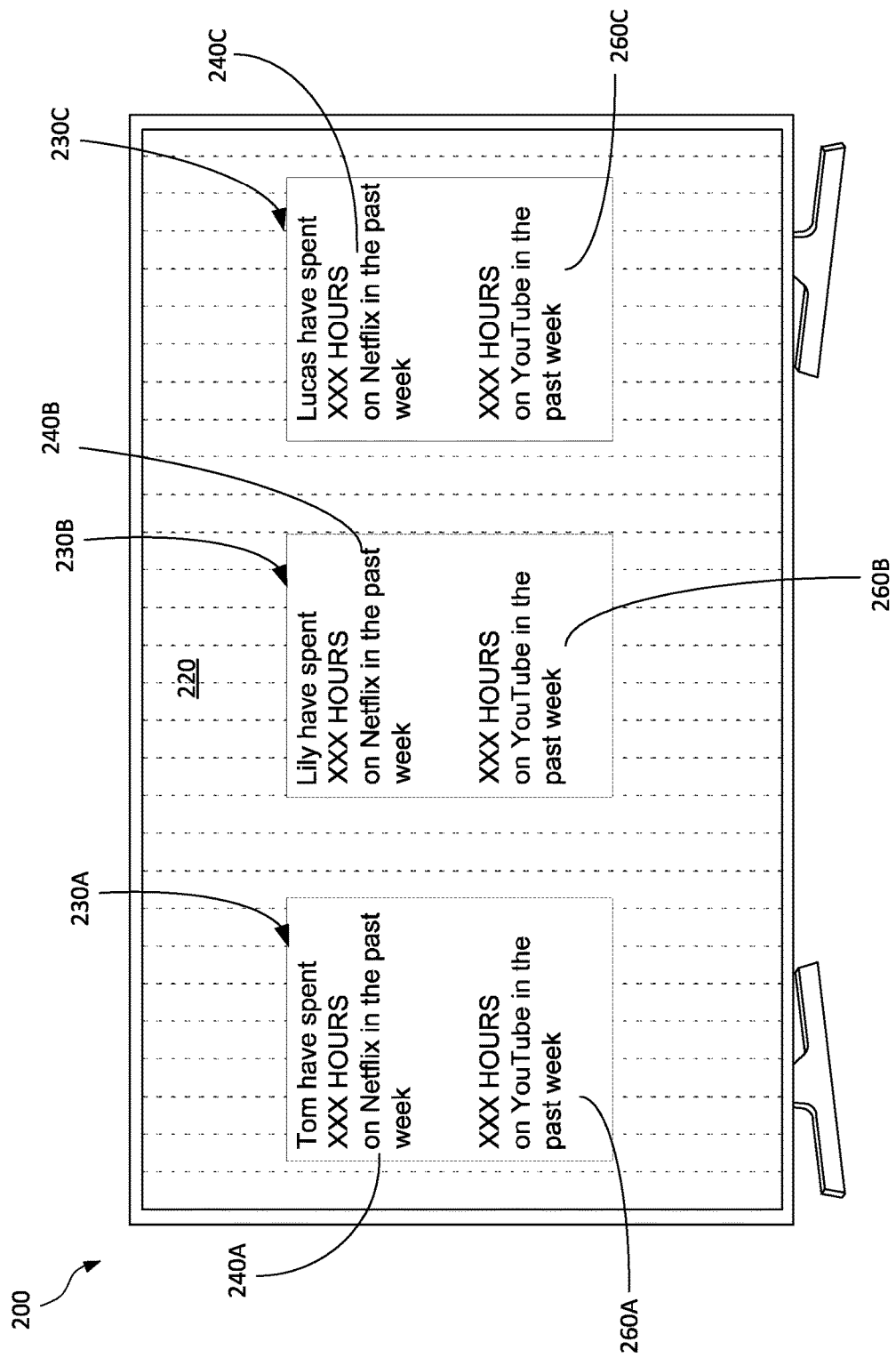
FIG. 17 depicts an electronic device in the form of a smart TV including a display displaying an AOD including per user application usage information messages, in accordance with embodiments of the present disclosure.

FIG. 17 depicts an embodiment of the present disclosure wherein the electronic device is a smart TV 200 displaying an AOD in the form of a screen saver display 220 which is displayed when the smart TV 200 is idle but powered on. The screen saver display 220 shows a plurality of per-user application use times or screen time statistics. Many media streaming applications require selection of a user before watching content. In some embodiments, the device access history collection module 320 can interface with the media streaming applications to collect the name of the current user using the application. The device access history collection module 320 also interfaces with the operating system of a smart TV 200, and is able to collect the open and close events of the media streaming applications. By computing the difference between the open timestamp and the close timestamp the media streaming application, usage by the user of the application can be determined, for example, by the device access history visualization module 360. For example, in the depicted embodiment there are per-user statistics for three users: Tom, Lily and Lucas. For the first user, Tom, the device screen time statistics 230A include time spent by Tom using a first application (e.g. Netflix™) 240A and time spent using a second application (e.g. Youtube™) 260A. Similarly, screen time statistics 230B include time spent by Lily using the first application 240B and time spent using the second application 260B. The screen time statistics 230C includes time spent by Luca on the first application 240C and on the second application 260C. Accordingly, each user may see their screen time and optimize their use of the smart TV.

The device access history events for an electronic device are collected in the background and used to derive device access statistics. Visualizations of the device access statistics are displayed on an always on display while the electronic device is in sleep mode. Advantageously, the device access statistics are accessible without having to take the device out of sleep mode or unlocking it. This encourages less use of the electronic device. Less use of the device reduces wear on the hardware, reduces communications bandwidth, and reduces power consumption. For example, various input devices such as the display, the mouse, the touchpad, the keypad may experience wear and eventual failure from the excessive use thereof. Overuse of streaming applications may cause network congestion due to collision in the communication between different devices using the same network. Overuse of telephone calls may also cause denial of service on some communication networks with limited capacities. Phone calls may cause a smartphone battery to be depleted so reducing phone calls improves battery life by reducing power consumption.

Figure 18:
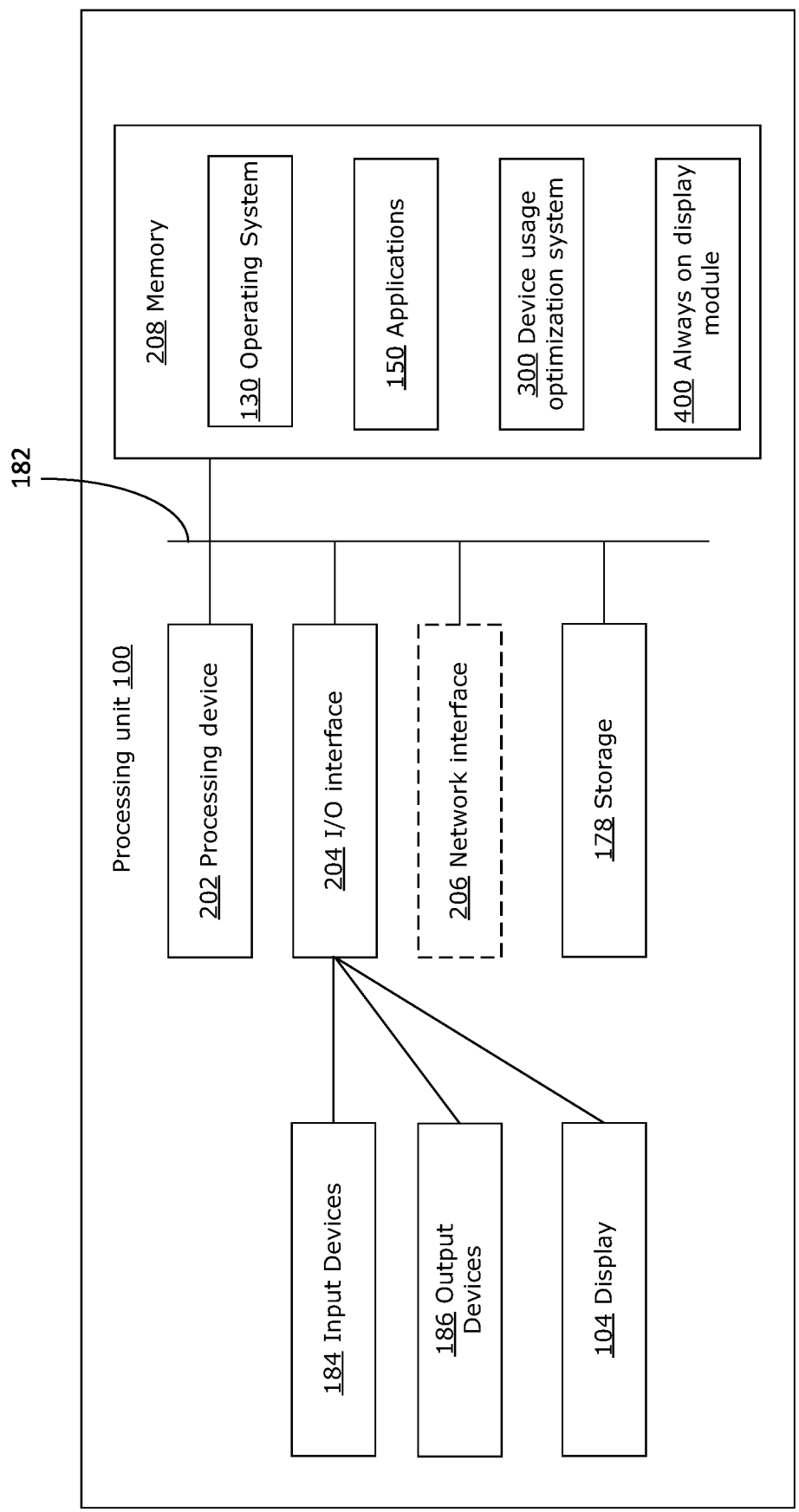
FIG. 18 depicts a processing unit suitable for implementing an electronic device, in accordance with embodiments of the present disclosure.

FIG. 18 depicts a processing unit 100 suitable for implementing an electronic device in this disclosure. The processing unit 100 may include one or more processing device(s) 202, such as a processor, a microprocessor, an application-specific integrated circuit (ASIC), a field-programmable gate array (FPGA), a dedicated logic circuitry, or combinations thereof. The processing unit 100 may also include one or more input/output (I/O) interfaces 204, which may enable interfacing with one or more appropriate input devices 184 and/or output devices 186. The processing unit 100 may include one or more network interfaces 206 for wired or wireless communication with a network (e.g., an intranet, the Internet, a P2P network, a WAN and/or a LAN) or other node. The network interfaces 206 may include wired links (e.g., Ethernet cable) and/or wireless links (e.g., one or more antennas) for intra-network and/or inter-network communications.

The processing unit 100 may also include one or more storage unit(s) 178, which may include a mass storage unit such as a solid state drive, a hard disk drive, a magnetic disk drive and/or an optical disk drive. The processing unit 100 may include a non-transitory memory coupled to the processor. For example, the processing unit 100 comprises one or more non-transitory memories 208 which may include a volatile (e.g. random access memory (RAM)) and non-volatile or non-transitory memories (e.g., a flash memory, magnetic storage, and/or a read-only memory (ROM)). The non-transitory memories 208 store programs that include machine-executable instructions for execution by the processing device(s) 202, such as to carry out examples described in the present disclosure. In example embodiments the programs include machine-executable instructions for implementing operating system (OS) software 130, a device usage optimization system 300, an AOD 400 and applications 150. The device usage optimization system 300 may include machine-executable instructions for execution by the processing device(s) 202 to carry out the methods described in this disclosure. In some other examples, one or more data sets and/or modules may be provided by an external memory (e.g., an external drive in wired or wireless communication with the processing unit 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 182 providing communication among components of the processing unit 100, including the processing device(s) 202, I/O interface(s) 204, network interface(s) 206, storage unit(s) 178 and/or non-transitory memories 208. The bus 182 may be any suitable bus architecture including, for example, a memory bus, a peripheral bus or a video bus.

Figure 19:
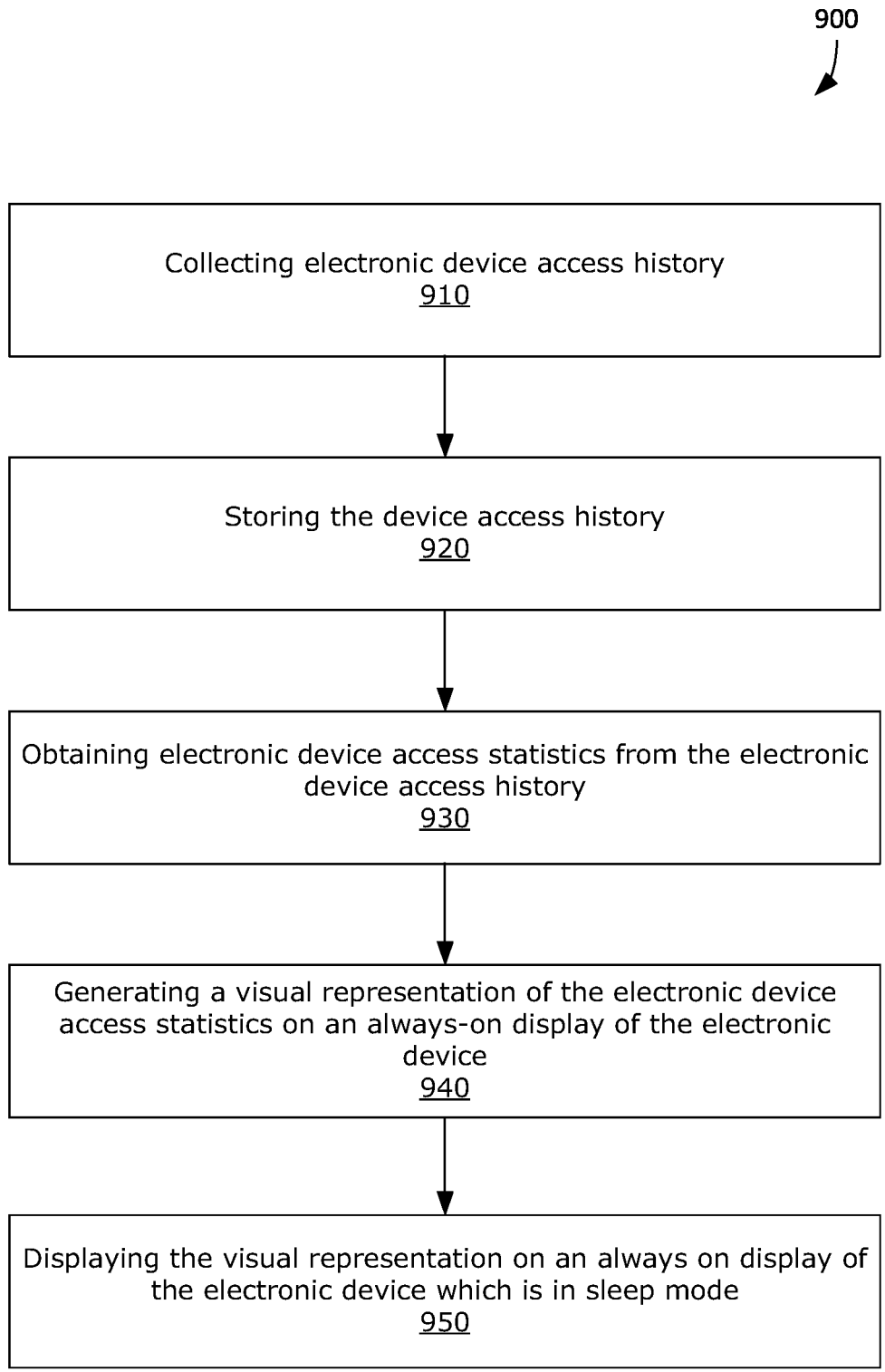
FIG. 19 is a flow chart depicting a method of optimizing usage of an electronic device, in accordance with embodiments of the present disclosure.

FIG. 19 depicts a simplified method 900 for alerting to the usage of an electronic device, in accordance with embodiments of the present disclosure. At step 910, a module on the electronic device, such as the device access history collection module 320, collects access history. At step 920, the collected device access history is stored, by a device access history storage module 340, for example. At step 930, device access statistics are obtained from the device access history. At step 940, a visual representation of the electronic device access statistics is generated, by the device access history visualization module 360, for example. Finally, at step 950, the visual representation is displayed on an always on display of the electronic device which is in sleep mode.

Certain adaptations and modifications of the described embodiments can be made. Therefore, the above discussed embodiments are considered to be illustrative and not restrictive.

The invention claimed is:

1. An electronic device usage alert method, comprising:
   collecting electronic device access history on an electronic device;
   obtaining electronic device access statistics from the electronic device access history;
   receiving an indication of always on display (AOD) technology available for the electronic device, where the AOD technology available for the electronic device indicates whether an AOD of the electronic device supports color visualization and whether the AOD of the electronic device supports displaying graphical content;
   generating a visual representation of the electronic device access statistics based on the AOD technology available for the electronic device, a visual form of the generated visual representation of the electronic device access statistics being selected based on the AOD technology available for the electronic device, wherein in response to determining that the AOD technology available for the electronic device supports color visualization, the visual form of the generated visual representation of the electronic device access statistics is selected to be a colorful visualization of the electronic device access statistics, and in response to determining that the AOD technology available for the electronic device does not support color visualization, the visual form of the generated visual representation of the electronic device access statistics is selected to be a gray-scale visualization of the electronic device access statistics, and in response to determining that the AOD technology available for the electronic device supports displaying graphical content, the visual form of the generated visual representation of the electronic device access statistics is selected to be a graphical visualization and a textual visualization of the electronic device access statistics, and in response to determining that the AOD technology available for the electronic device does not support displaying graphical content, the visual form of the generated visual representation of the electronic device access statistics is selected to be a textual visualization of the electronic device access statistics, the visual representation for alerting a user to a need for reducing device usage; and
   in response to the electronic device entering sleep mode, displaying the visual representation on an AOD of the electronic device, the visual representation being visible on the AOD while the electronic device is in sleep mode.

2. The electronic device usage alert method of claim 1, wherein collecting device access history comprises querying at least one system module to obtain event information comprised of device access events.

3. The electronic device usage alert method of claim 1, wherein collecting device access history comprises intercepting system messages including device access event data.

4. The electronic device usage alert method of claim 1, wherein obtaining the electronic device access statistics from the electronic device access history comprises calculating a usage time of the electronic device in a time period.

5. The electronic device usage alert method of claim 4, wherein:
   the electronic device access history comprises a plurality of device lock events and a plurality of device unlock events; and
   each lock event of the plurality of device lock events has a lock event timestamp, each unlock event of the plurality of device unlock events has an unlock event timestamp, and the usage time is a summation of a plurality of differences between each unlock event timestamp and each corresponding lock event timestamp.

6. The electronic device usage alert method of claim 1, wherein the electronic device access history comprises a plurality of application open events and a plurality of application close events, and the electronic device access statistics comprises a screen time for at least one application.

7. The electronic device usage alert method of claim 6, wherein each application open event of the plurality of application open events comprises an open event time stamp, each application close event of the plurality of application close events comprises a close event timestamp, and the screen time of a particular application is a difference between an open event timestamp and a corresponding close event timestamp.

8. The electronic device usage alert method of claim 1, wherein the electronic device access history comprises a plurality of phone call initiation and a plurality of phone call termination events, and the electronic device access statistics comprise a total duration of voice calls in a time period, the total duration of voice calls being a summation of a plurality of voice call durations each being a difference between a phone call initiation timestamp of a phone call initiation event and a phone call termination timestamp of a corresponding phone call termination event.

9. The electronic device usage alert method of claim 1, wherein the electronic device access history comprises a plurality of application install and a plurality of application uninstall events, and the electronic device access statistics comprise an alert that more applications are being installed than being uninstalled.

10. The electronic device usage alert method of claim 1, wherein the electronic device access history comprises a plurality of photo or video capturing events, and the electronic device access statistics comprise a count of photos or videos captured in a time period.

11. An electronic device, comprising:
a display having an always on display (AOD) feature when the electronic device is in sleep mode;
a processor coupled to the display; and
a non-transitory memory coupled to the processor, the non-transitory memory storing machine-executable instructions which, when executed by the processor, cause the electronic device to:
collect electronic device access history on the electronic device;
obtain electronic device access statistics from the electronic device access history;
receive an indication of AOD technology available for the display, where the AOD technology available for the display indicates whether the display supports color visualization and whether the display supports displaying graphical content;
generate a visual representation of the electronic device access statistics based on the AOD technology available for the display, a visual form of the generated visual representation of the electronic device access statistics being selected based on of the AOD technology available for the display, wherein in response to determining that the AOD technology available for the display supports color visualization, the visual form of the generated visual representation of the electronic device access statistics is selected to be a colorful visualization of the electronic device access statistics, and in response to determining that the AOD technology available for the display does not support color visualization, the visual form of the generated visual representation of the electronic device access statistics is selected to be a gray-scale visualization of the electronic device access statistics, and in response to determining that the AOD technology available for the display supports displaying graphical content, the visual form of the generated visual representation of the electronic device access statistics is selected to be a graphical visualization and a textual visualization of the electronic device access statistics, and in response to determining that the AOD technology available for the display does not support displaying graphical content, the visual form of the generated visual representation of the electronic device access statistics is selected to be a textual visualization of the electronic device access statistics, the visual representation for alerting a user to a need for reducing device usage; and
display the visual representation on the AOD while the electronic device is in sleep mode.

12. The electronic device of claim 11, wherein the machine-executable instructions which cause the electronic device to collect electronic device access history comprise machine-executable instructions which query at least one system module to obtain event information comprised of device access events.

13. The electronic device of claim 11, wherein the machine-executable instructions which cause the electronic device to collect electronic device access history comprise machine-executable instructions which intercept system messages including device access event data.

14. The electronic device of claim 12, wherein the machine-executable instructions which cause the electronic device to obtain electronic device access statistics comprise machine-executable instructions which cause the electronic device to calculate a usage time of the electronic device in a time period.

15. The electronic device of claim 14, wherein:
the electronic device access history comprises a plurality of device lock events and a plurality of device unlock events; and
each lock event of the plurality of device lock events has a lock event timestamp, and each unlock event of the plurality of device unlock events has an unlock event timestamp, and the usage time is a summation of a plurality of differences between each unlock event timestamp and each corresponding lock event timestamp.

16. The electronic device of claim 11, wherein:
the electronic device access history comprises a plurality of application open events and a plurality of application close events;
the electronic device access statistics comprises a screen time for at least one application;
each application open event of the plurality of application open events comprises an open event time stamp;
each application close event of the plurality of application close events comprises a close event timestamp; and
the screen time of a particular application is a difference between an open event timestamp and a corresponding close event timestamp.

17. The electronic device of claim 11, wherein the electronic device access history comprises a plurality of phone call initiation and a plurality of phone call termination events, and the electronic device access statistics comprise a total duration of voice calls in a time period, the total duration of voice calls being a summation of a plurality of voice call durations each being a difference between a phone call initiation timestamp of a phone call initiation event and a phone call termination timestamp of a corresponding phone call termination event.

18. The electronic device of claim 11, wherein the electronic device access history comprises a plurality of application install and a plurality of application uninstall events, and the electronic device access statistics comprise an alert that more applications are being installed than being uninstalled.

19. The electronic device of claim 11, wherein the electronic device access history comprises a plurality of photo or video capturing events, and the electronic device access statistics comprise a count of photos or videos captured in a time period.

20. A non-transitory computer-readable medium having machine-executable instructions stored thereon, the machine-executable instructions, when executed by a processor of an electronic device, cause the electronic device to:

collect electronic device access history on the electronic device;

obtain electronic device access statistics from the electronic device access history;

receive an indication of always on display (AOD) technology available for the electronic device, where the AOD technology available for the electronic device indicates whether an AOD of the electronic device supports color visualization and whether the AOD of the electronic device supports displaying graphical content;

generate a visual representation of the electronic device access statistics based on the AOD technology available for the electronic device, a visual form of the generated visual representation of the electronic device access statistics being selected based on the AOD technology available for the electronic device, wherein in response to determining that the AOD technology available for the electronic device supports color visualization, the visual form of the generated visual representation of the electronic device access statistics is selected to be a colorful visualization of the electronic device access statistics, and in response to determining that the AOD technology available for the electronic device does not support color visualization, the visual form of the generated visual representation of the electronic device access statistics is selected to be a gray-scale visualization of the electronic device access statistics, and in response to determining that the AOD technology available for the electronic device supports displaying graphical content, the visual form of the generated visual representation of the electronic device access statistics is selected to be a graphical visualization and a textual visualization of the electronic device access statistics, and in response to determining that the AOD technology available for the electronic device does not support displaying graphical content, the visual form of the generated visual representation of the electronic device access statistics is selected to be a textual visualization of the electronic device access statistics, the visual representation for alerting a user to a need for reducing device usage; and in response to the electronic device entering sleep mode, display the visual representation on an AOD of a display of the electronic device, the visual representation being visible on the AOD while the electronic device is in sleep mode.

* * * * *